United States Patent
Zhu et al.

(10) Patent No.: US 9,025,527 B2
(45) Date of Patent: May 5, 2015

(54) ADAPTIVE CHANNEL REUSE MECHANISM IN COMMUNICATION NETWORKS

(71) Applicant: QUALCOMM Incorporated, San Diego, CA (US)

(72) Inventors: Hao Zhu, Ocala, FL (US); Srinivas Katar, Gainesville, FL (US); Lawrence W. Yonge, III, Ocala, FL (US)

(73) Assignee: QUALCOMM Incorporated, San Diego, CA (US)

( * ) Notice: Subject to any disclaimer, the term of this patent is extended or adjusted under 35 U.S.C. 154(b) by 129 days.

(21) Appl. No.: 13/713,672

(22) Filed: Dec. 13, 2012

(65) Prior Publication Data

US 2014/0169186 A1 Jun. 19, 2014

(51) Int. Cl.
- H04W 4/00 (2009.01)
- H04B 3/54 (2006.01)
- H04L 5/00 (2006.01)
- H04W 16/14 (2009.01)
- H04W 74/08 (2009.01)

(52) U.S. Cl.
CPC ........ H04L 5/00 (2013.01); H04B 3/542 (2013.01); H04B 2203/5495 (2013.01); H04W 16/14 (2013.01); H04W 74/0808 (2013.01)

(58) Field of Classification Search
USPC ................. 370/328, 331, 332, 350
See application file for complete search history.

(56) References Cited

U.S. PATENT DOCUMENTS

| 7,822,058 | B2 | 10/2010 | Ayyagari et al. |
| 8,073,015 | B2 | 12/2011 | Galli et al. |
| 8,295,301 | B2 | 10/2012 | Yonge, III et al. |
| 2011/0014910 | A1 | 1/2011 | Yonge, III et al. |
| 2012/0155291 | A1* | 6/2012 | Koivisto et al. ........ 370/252 |
| 2012/0315895 | A1* | 12/2012 | Jovanovic et al. ....... 455/424 |

(Continued)

FOREIGN PATENT DOCUMENTS

WO 2013101953 7/2013

OTHER PUBLICATIONS

"International Application No. PCT/US2013/071513 International Search Report and Written Opinion", Jun. 10, 2014, 12 pages.

(Continued)

*Primary Examiner* — Andrew Lee

(74) *Attorney, Agent, or Firm* — DeLizio Gilliam, PLLC

(57) ABSTRACT

A feature-capable device that supports channel reuse and is part of a local network can determine whether to reuse or share a communication channel with a neighbor network when the local network and/or the neighbor network include at least one legacy device that does not support adaptive channel reuse. The feature-capable device can determine channel performance measurements associated with each legacy device in the local network and/or in the neighbor network. The feature-capable device can compare the channel performance measurements against corresponding performance thresholds. The local network and the neighbor network can reuse the channel if the channel performance measurements associated with each of the legacy devices meet the corresponding performance thresholds. The local network and the neighbor network can share the channel if the channel performance measurements of at least one of the legacy devices does not meet the corresponding performance thresholds.

32 Claims, 11 Drawing Sheets

(56) References Cited

U.S. PATENT DOCUMENTS

| | | | |
|---|---|---|---|
| 2013/0064146 A1* | 3/2013 | Ahn et al. | 370/280 |
| 2013/0109421 A1* | 5/2013 | Guey et al. | 455/507 |
| 2013/0196676 A1* | 8/2013 | Koudouridis et al. | 455/452.1 |
| 2013/0272170 A1* | 10/2013 | Chatterjee et al. | 370/280 |
| 2013/0315111 A1* | 11/2013 | Ashikhmin et al. | 370/280 |
| 2014/0024388 A1* | 1/2014 | Earnshaw et al. | 455/452.2 |
| 2014/0029521 A1* | 1/2014 | Puthenpura et al. | 370/329 |
| 2014/0078922 A1* | 3/2014 | Xing | 370/252 |
| 2014/0140295 A1* | 5/2014 | Manssour | 370/329 |
| 2014/0148184 A1* | 5/2014 | Dahrouj et al. | 455/452.1 |

OTHER PUBLICATIONS

Ayyagari et al, "A coordination and bandwidth sharing method for multiple interfering neighbor networks", Consumer Communications and Networking Conference, 2005. CCNC. 2005 Second IEEE, Jan. 3-6, 2005, pp. 206-210.

Do, et al., "Channel Reuse Improvement for Coexistence between Access and In-Home PLC Systems with Dynamic Resource Allocation", URL:http://www.diegm.uniud.it/wsplc09/templates/WSPLC09_Proceedings.pdf [retrieved on May 7, 2014], Oct. 1, 2009, 4 pages.

* cited by examiner

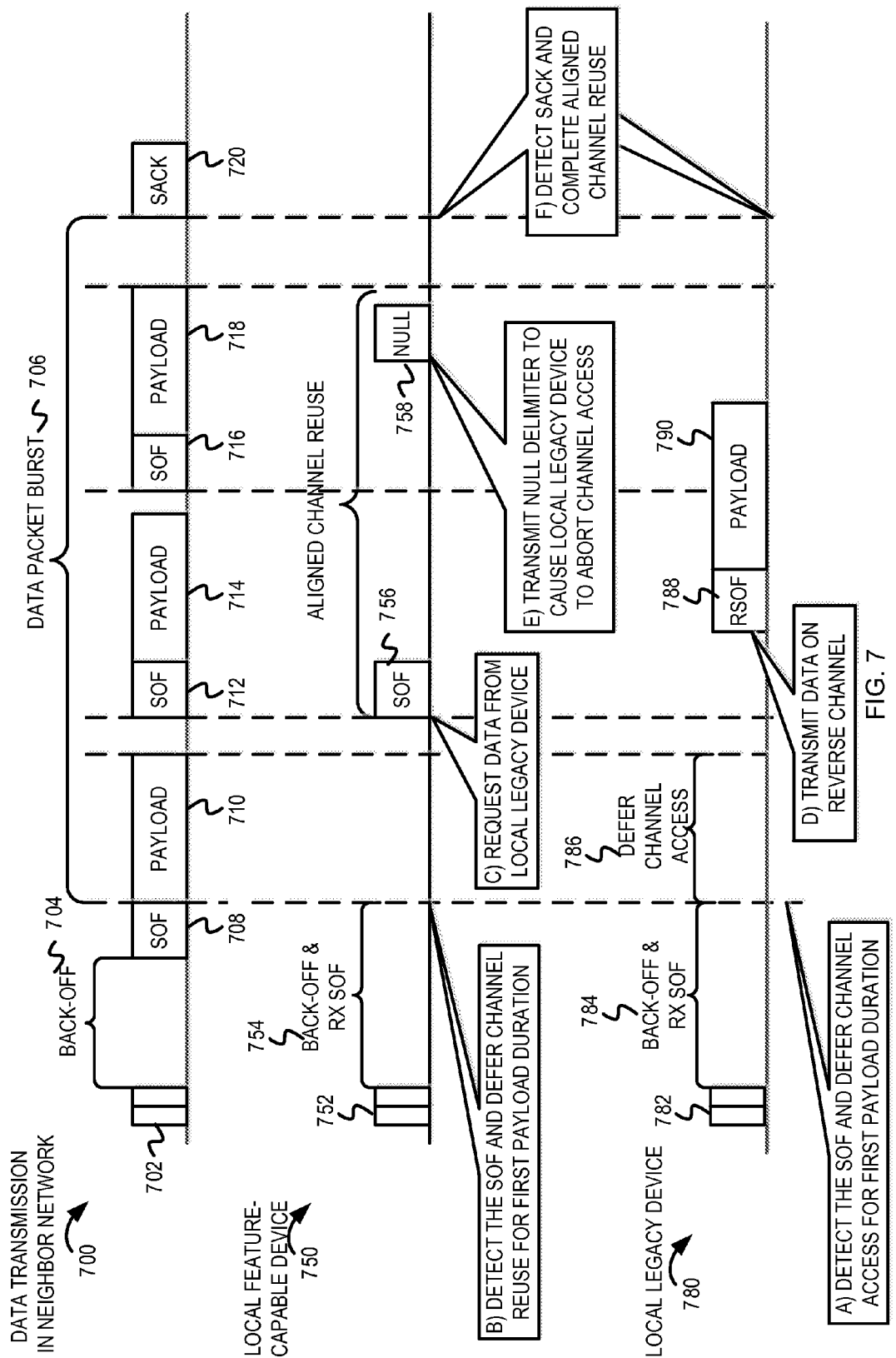

ADAPTIVE CHANNEL REUSE MECHANISM IN COMMUNICATION NETWORKS

BACKGROUND

Embodiments of the inventive subject matter generally relate to the field of communication networks and, more particularly, to an adaptive channel reuse mechanism in a communication network.

In many data communication systems (e.g., satellite communication systems, wireless communication systems, powerline communication (PLC) systems, coaxial cable communication systems, telephone line systems, etc.), the data communication medium can be shared among multiple communication devices. In a shared communication medium, carrier sense multiple access (CSMA) protocols can be employed to minimize interference between communication devices in the shared communication medium. In accordance with the CSMA protocols, a transmitting communication device can "sense" the communication medium and transmit on the communication medium after verifying the absence of other traffic on the shared communication medium. If the channel is currently occupied, the transmitting communication device can defer its transmission until the channel becomes available.

SUMMARY

Various embodiments of an adaptive channel reuse mechanism in a communication network are disclosed. In one embodiment, a neighbor network is identified at a first network device of a plurality of network devices of a local network. The local network and the neighbor network each communicate via a common communication channel and the first network device belongs to a first device type that supports inter-network channel reuse. The first network device determines an inter-network channel reuse decision that indicates whether to reuse a communication channel between the local network and the neighbor network. It is determined whether at least one of the local network and the neighbor network comprises a network device that belongs to a second device type, wherein the network device that belongs to the second device type does not support inter-network channel reuse. If determined that at least one of the local network and the neighbor network comprise a network device that belongs to the second device type and if the inter-network channel reuse decision indicates to reuse the communication channel between the local network and the neighbor network, channel performance measurements associated with one or more network devices that belong to the second device type in the local network and the neighbor network are determined based, at least in part, on reusing the communication channel with the one or more network devices that belong to the second device type. It is also determined whether to maintain the inter-network channel reuse decision based, at least in part, on comparing the channel performance measurements associated with each network device that belongs to the second device type against corresponding performance measurement thresholds.

BRIEF DESCRIPTION OF THE DRAWINGS

The present embodiments may be better understood, and numerous objects, features, and advantages made apparent to those skilled in the art by referencing the accompanying drawings.

FIG. 7 is a timing diagram illustrating another example embodiment for aligned channel reuse, when the neighbor network is configured to transmit a packet burst;

DESCRIPTION OF EMBODIMENT(S)

Figure 1:
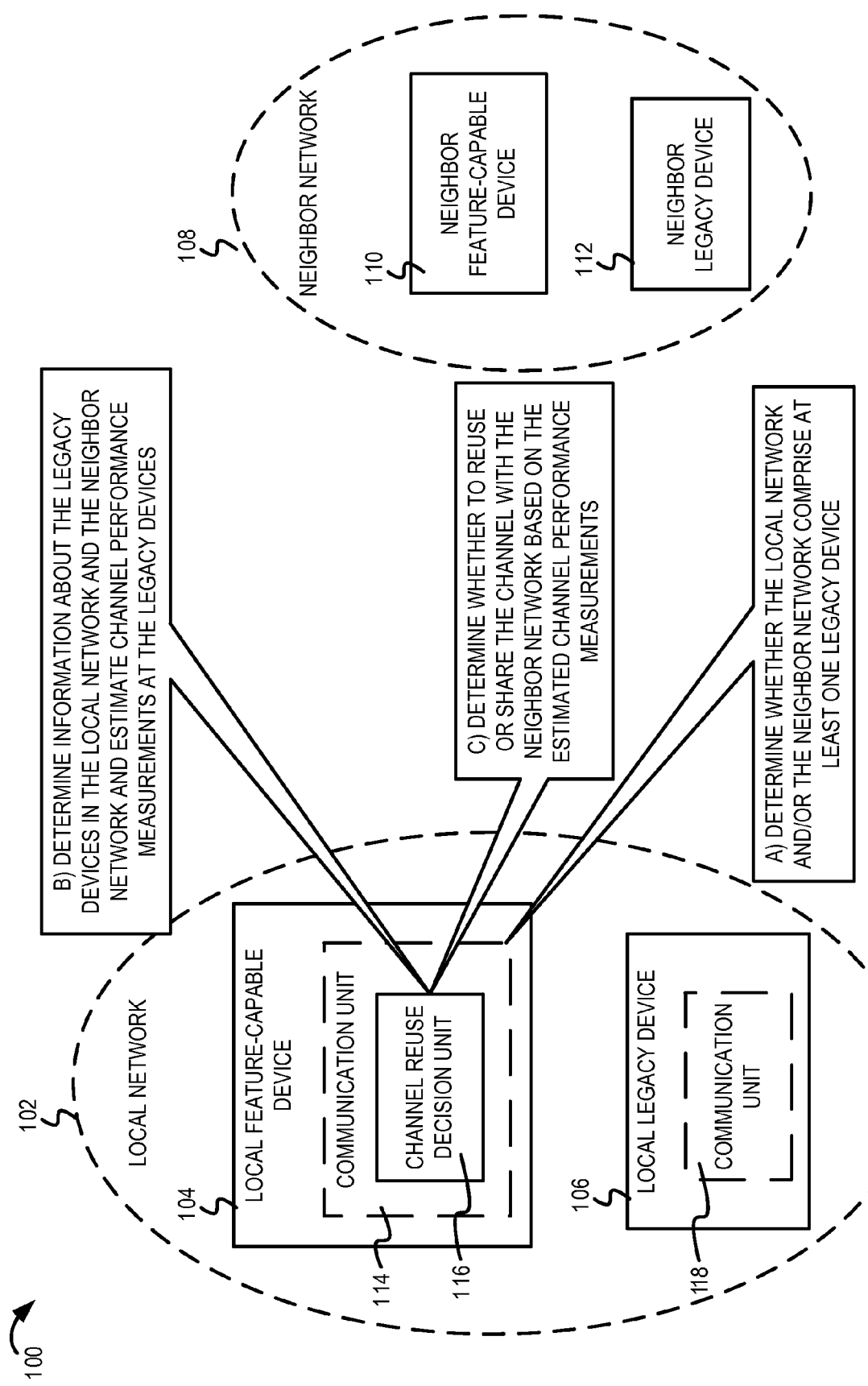
FIG. 1 is an example conceptual diagram including an adaptive channel reuse mechanism in a communication network.

The description that follows includes exemplary systems, methods, techniques, instruction sequences, and computer program products that embody techniques of the present inventive subject matter. However, it is understood that the described embodiments may be practiced without these specific details. For instance, although examples refer to adaptive channel reuse operations in a powerline communication (PLC) network, embodiments are not so limited. In other embodiments, the adaptive channel reuse operations can be implemented by network devices in other suitable shared-medium communication networks, such as wireless local area networks (WLAN), coax networks, phone line local area networks, etc. In other instances, well-known instruction instances, protocols, structures, and techniques have not been shown in detail in order not to obfuscate the description.

In a shared data communication medium, when the interference signal strength (at a receiving device) is small, such that the signal-to-interference-plus-noise ratio (SINR) at the receiving device is high, both a transmitter device and an interfering device may simultaneously transmit data over the same communication channel, thus "reusing" the communication channel. Traditional channel reuse techniques can pre-specify a channel reuse pattern. For example, in accordance with the traditional channel reuse techniques, a channel allocation mechanism can be used to allow spatially separate devices use the same channel at the same time. However, such traditional channel reuse techniques can require a centralized channel coordination mechanism. Using a centralized channel coordination mechanism to find the optimal channel allocation solution can be very complicated in a powerline communication network (e.g., a home network). Also, because network usage can be very dynamic, implementing the static (or pre-specified) channel allocation can result in loss in spectrum efficiency because of underused channels. Self-deployed communication networks (e.g. WLANs, PLC networks, etc.) typically use carrier sensing multiple access (CSMA) techniques to minimize interference between network devices sharing a communication medium. Furthermore, a shared communication medium may also host multiple communication networks. For example, multiple PLC networks may share a common powerline medium. As part of determining whether to reuse or share the communication channel with a neighbor communication network, a local communication network (e.g., the network devices in the local communication network) may ensure that reusing the channel will not result in performance loss for all the network devices in the local and neighbor communication networks. However, in some embodiments, network devices ("feature-capable devices") that support and implement the adaptive channel reuse procedures described herein may need to operate in conjunction with network devices ("legacy devices") that do not support and implement the adaptive channel reuse procedures. If the local communication network and/or the neighbor communication network comprise one or more legacy devices, all feature-capable devices in the local and neighbor communication networks may be forced to disable the adaptive channel reuse procedures and to operate in accordance with traditional CSMA procedures, to avoid any performance loss at the legacy device. However, such a conservative solution to the presence of legacy and feature-capable devices can result in inefficient use of network resources and can affect the performance of the communication medium.

In some embodiments, functionality can be implemented (e.g., at the feature-capable devices) for adaptive channel reuse in the presence of legacy devices. The feature-capable device can identify legacy devices (i.e., network devices that do not support channel reuse) in its local network and in one or more neighbor networks. The feature-capable device can estimate channel performance measurements associated with each of the identified legacy devices and can determine (based on analyzing the channel performance measurements) whether reusing the channel with the neighbor network will impact the performance of the legacy device. If reusing the channel with the neighbor network will affect the performance of any legacy device (in the local network and/or the neighbor network), the feature-capable device can determine that the local network and the neighbor network should not reuse the channel and, instead, should share the communication channel. However, if reusing the channel with the neighbor network will not affect the performance of any legacy device (in the local network and/or the neighbor network), the feature-capable device can determine that the local network and the neighbor network should reuse the channel. The feature-capable device can also execute operations to ensure that the legacy device in the local network does not synchronize with transmissions of the neighbor network, as will be further described in the Figures below. Such an adaptive channel reuse mechanism that takes the performance of the legacy devices into consideration and enables the legacy devices to passively reuse the channel with the neighbor network can result in a more efficient channel reuse and improved communication performance.

FIG. 1 is an example conceptual diagram including an adaptive channel reuse mechanism in a communication network. FIG. 1 depicts a shared communication medium 100 comprising two communication networks 102 and 108. The communication network 102 comprises a feature-capable device 104 and a legacy device 106; while the communication network 108 comprises a feature-capable device 110 and a legacy device 112. The adaptive channel reuse operations will be discussed with reference to the feature-capable device 104. Accordingly, the communication network 102 to which the feature-capable device 104 belongs is herein referred to as the "local network" and the feature-capable device 104 is also referred to as "local feature-capable device 104." The communication network 108 that is adjacent to the local network 102 and for which the adaptive channel reuse operations will be executed is referred to as the "neighbor network."

The local feature-capable device 104 comprises a communication unit 114 (depicted by dashed lines). The communication unit 114 comprises a channel reuse decision unit 116. The legacy device 106 in the local network 102 ("local legacy device") also comprises a communication unit 118 (depicted by dashed lines). In addition, although not depicted in FIG. 1, the feature-capable device 110 and the legacy device 112 in the neighbor network 108 may also comprise their respective communication units as depicted for the local feature-capable device 104 and the local legacy device 106 respectively. The network devices 104, 106, 110, and 112 can each be electronic devices configured to implement one or more communication protocols or access technologies, such as a laptop computer, a tablet computer, a mobile phone, a smart appliance, a gaming console, an access point, a desktop computer, or other suitable electronic devices. In some embodiments, the communication unit of the network devices 104, 106, 110, and 112 can each be implemented on a system-on-a-chip (SoC), an application specific integrated circuit (ASIC), or another suitable integrated circuit to enable network communications on their respective network device. In some embodiments, the communication units may each comprise one or more processors and memory, and may each be implemented in one or more integrated circuits on one or more circuit boards of their respective network device. As will be further described below, the channel reuse decision unit 116 of the local feature-capable device 104 can analyze information about the neighbor network 108 and determine whether the local network 102 should share or reuse the communication channel with the neighbor network 108. In reusing the channel with the neighbor network 108, the local network 102 can ignore detected transmissions that are associated with the neighbor network 108 and can initiate its own transmissions irrespective of whether the neighbor network 108 is currently transmitting. In sharing the channel with the neighbor network 108, the local network 102 can coordinate with the neighbor network 108 (e.g., execute CSMA procedures) and can initiate transmissions only if the neighbor network 108 is not currently transmitting.

At stage A, the local feature-capable device 104 (e.g., the channel reuse decision unit 116) determines whether the local network 102 and/or the neighbor network 108 comprise at least one legacy device. The local feature-capable device 104 can employ various techniques to identify other feature-capable devices in the local network 102 and the neighbor network 108 and to determine whether the local network 102 and the neighbor network 108 comprise at least one legacy device. In one embodiment, the local feature-capable device 104 may transmit a software version request message (or another suitable message) to a target network device and wait for a response message. If the target network device does not transmit the response message (e.g., drops/discards the software version request message) or transmits a response message with an unexpected version number indication, the local feature-capable device 104 can determine that the target network device is a legacy device that does not support the adaptive channel reuse operations. If the local feature-capable device 104 receives the response message with an appropriate version number indication from the target network device, the local feature-capable device 104 can determine that the target network device is a feature-capable device. In another embodiment, the local feature-capable device 104 can listen to the messages exchanged on the communication channel and can determine whether any of the network devices transmitted a management message indicating support of the adaptive channel reuse operations. If the local feature-capable device 104 does not detect any management messages (that indicate support of the adaptive channel reuse operations) within a predetermined time interval, the local feature-capable device 104 can determine the other network devices are legacy devices. In another embodiments, after the local feature-capable device 104 detects legacy devices in the local network 102, the local feature-capable device 104 can transmit one or more management messages (e.g., multi-network broadcast management messages) to notify other feature-capable devices (e.g., in the local network 102 and the neighbor network 108) of the legacy devices 106 in the local network 108. Likewise, the local feature-capable device 104 can receive one or more management messages from feature-capable devices 110 in the neighbor networks 108 indicating the legacy devices 112 in the neighbor networks 108. After identifying the legacy devices in the local network and/or the neighbor network 108, the local feature-capable device 104 can execute operations in stages B-C to estimate the channel condition at the legacy devices and to determine whether to reuse the channel with the neighbor network.

At stage B, the local feature-capable device 104 (e.g., the channel reuse decision unit 116) can determine information about legacy devices 106 and 112 in the local network 102 and the neighbor network 108. For example, the channel reuse decision unit 116 can detect transmissions (e.g., start of frame delimiters, acknowledgment messages, etc.) in the neighbor network 108 and can determine the information about the legacy devices 106 and 112. In one embodiment, for the legacy device 112 in the neighbor network 108, the channel reuse decision unit 116 can determine a received signal strength, identifying information about a transmitting device in the neighbor network 108, identifying information about a receiving device in the neighbor network 108, a transmission data rate, transmission feedback (e.g., bit error rate, etc.), and other suitable performance measurements associated with the neighbor network 108. In some embodiments, the channel reuse decision unit 116 (or a performance evaluation unit, not shown) can use various techniques to determine the received signal strength. In one example, the local feature-capable device 104 can comprise an automatic gain control (AGC) unit (not shown) to regulate the received signal and minimize the quantization noise at subsequent digital processing components by amplifying the received signal. The AGC unit of the local feature-capable device 104 can determine an appropriate AGC setting ("AGC gain") for receiving the signal (transmitted in the neighbor network 108). The local feature-capable device 104 can estimate the received signal strength based on the AGC gain. Typically, a high AGC gain can indicate low received signal strength and vice versa. In another example, the local feature-capable device 104 can employ other suitable techniques to infer the signal strength of the received signal based on the signal energy of the preamble.

The identifying information of a transmitting device in the neighbor network and its network identity information can be extracted based, at least in part, on information in the received signal. In one example, the identifying information of the transmitting device can be determined from a source terminal equipment identifier (STEI) field in a start of frame (SOF) delimiter of the received signal. The network identity information can be determined from a short network identifier (SNID) field in the SOF delimiter. In some embodiments, the local feature-capable device 104 can record the received signal strength in a table and can index the record by the identifying information of the transmitting device and/or the network identity information. It is noted that in some embodiments, the delimiter may not comprise the identifying information of the transmitting device and/or the network identity information. In this embodiment, the local feature-capable device 104 can discard the measured signal strength for a current received physical layer convergence procedure (PLCP) protocol data unit (PPDU) transmission. Alternatively, in this embodiment, local feature-capable device 104 can infer the requisite identifying information based, at least in part, on MAC protocol semantics. For example, if the local feature-capable device 104 receives the delimiter of an acknowledgement frame (e.g., a selective acknowledgement (SACK) frame) and the SACK frame does not comprise the identifying information of the transmitting device, this information can be inferred from a destination terminal equipment identifier (DTEI) field in the SOF delimiter of a most recently transmitted data frame because the acknowledgement frame is typically transmitted as soon as the receiving device receives the payload.

In some embodiments, the local feature-capable device 104 can infer the data transmission rate (e.g., of a neighbor network transmission) based on a bit loading estimate (BLE) field in the SOF delimiter. The BLE field can be an 8-bit field that represents the number of data bits that can be transmitted on the channel per microsecond. The number of data bits can take into consideration the overhead incurred due to the cyclic prefix and forward error correction (FEC), but may not take into consideration the overhead associated with the PPDU frame format (e.g., the delimiters). Based, at least in part, on knowledge of the transmission data rate and the relationship between the transmission data rate and the SINR, the channel reuse decision unit 116 can estimate the channel condition between the transmitting device and the receiving device in the neighbor network. The local feature-capable device 104 may also extract the data transmission feedback from the acknowledgement (e.g., SACK) frame. In the example of a PLC system, the data transmission feedback can be transmitted in a predetermined field of the SACK frame. The local feature-capable device 104 can decode the SACK frame to determine the transmission status of each PPDU transmitted by the transmitting device in the neighbor network. The data transmission feedback can be used to verify if the transmission rate used by the transmitting device is appropriate for the communication channel. For example, if the data transmission feedback indicates a high number of PPDU failures (e.g., that the receiving device did not receive a large number of PPDU's transmitted by the transmitting device), the channel reuse decision unit 116 can apply a negative adjustment while inferring the channel condition between the transmitting device and the receiving device in the neighbor network 108. However, if the data transmission feedback indicates zero PPDU failures, the channel reuse decision unit 116 can apply a positive adjustment while inferring the channel condition between the transmitting device and the receiving device in the neighbor network 108. In some implementations, the channel reuse decision unit 116 may require at least a predetermined number of samples to estimate the channel condition between a pair of network devices in the neighbor network (e.g., because of the limitations of the channel adaptation process, the presence of transmission collisions, noise, interference, etc.). The channel reuse decision unit 116 can apply a suitable information processing technique to filter out the inaccurate channel estimates. Example operations for estimating the channel performance measurements at the legacy devices are further described with reference to FIGS. 2-8.

At stage C, the channel reuse decision unit 116 determines whether to reuse or share the channel with the neighbor network based on the estimated channel performance measurements. In some embodiments, the channel reuse decision unit 116 can determine whether to reuse or share the channel with the neighbor network 108 based on the channel performance measurements (determined at stage B). The channel performance measurements can include a data transmission rate, an error rate, a received signal strength indicator, and other suitable measurements that are representative of the channel performance. As will be further described in FIGS. 2-8, the channel reuse decision unit 116 may determine the channel performance measurements (e.g., received signal strength) associated with the neighbor legacy device 112. The channel reuse decision unit 116 can compare the channel performance measurements against corresponding performance thresholds. If the performance measurements associated with all the legacy devices 106 and 112 are in accordance with the corresponding performance thresholds, the channel reuse decision unit 116 can determine to reuse the channel with the neighbor network. However, if the performance measurements of at least one of the legacy devices (in the local network 102 and/or the neighbor network 108) are not in accordance with the corresponding performance thresholds, the channel reuse decision unit 116 can determine to share the channel with the neighbor network 108.

Figure 2:
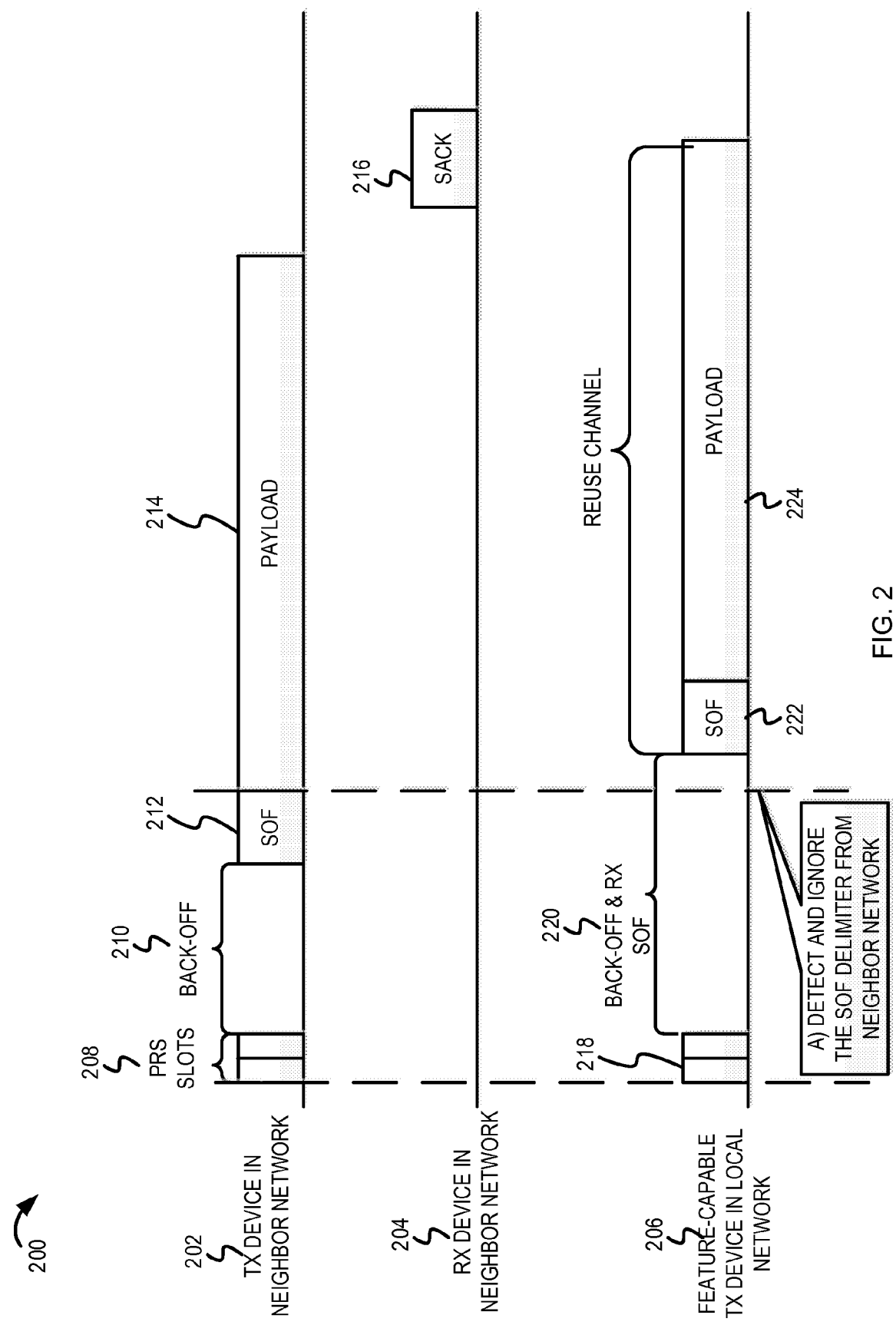
FIG. 2 is an example timing diagram illustrating channel reuse between a local network and a neighbor network.

FIG. 2 is an example timing diagram 200 illustrating channel reuse between a local network and a neighbor network. FIG. 2 depicts operations of a transmitting device 202 in a neighbor network, a receiving device 204 in the neighbor network, and a feature-capable transmitting device 206 in a local network ("local feature-capable transmitting device"). In FIG. 2, the transmitting device 202 determines to transmit a frame. The transmitting device 202 can transmit one or more priority symbols in priority resolution (PRS) slots 208. The priority symbols indicate the transmission priority of the transmitting device's pending data frame. In accordance with CSMA protocols, another network device with lower transmission priority will yield the channel to the network device with the higher transmission priority. After the two PRS slots 208, the transmitting device 202 wins the channel contention (in the neighbor network) due to transmission priority and initiates a random back-off procedure by deferring transmission for a randomly selected number of contention slots (depicted as back-off period 210 in FIG. 2). If the channel is still free/unoccupied after the back-off period 210 ends, the transmitting device 202 can start to transmit its data frame. In some embodiments, the data frame may be encapsulated by a MAC layer header referred to as a start of frame (SOF) delimiter 212. In some embodiments, for each data packet from the MAC layer, the physical (PHY) layer can organize the packet into bit stream data units (e.g., PHY protocol data units (PPDU)) for transmission over the powerline medium. In one example, a PPDU can comprise a preamble, a frame control portion, and the payload. In this example, the preamble and frame control, together, may be referred to as the "SOF delimiter." The preamble may be a predetermined pattern that indicates the start of the PPDU. The frame control portion of the PPDU can include MAC and PHY related control information such as, the source and destination address of the PPDU, the network to which the transmitter device belongs, information required to demodulate the PPDU payload (e.g. modulation and coding information), the information regarding the transmission time/length of the payload, and other channel access information. The payload can comprise application data, management messages, or NULL information (e.g., no payload). If the receiver device 204 successfully receives the frame, the receiver device 204 can transmit a selective acknowledgement (SACK) frame. In FIG. 2, the transmitting device 202 in the neighbor network transmits the SOF delimiter 212 and the payload 214. The receiving device 204 in the neighbor network can perform symbol correlation tests for preamble detection. A degree of correlation (determined from the symbol correlation tests) can be used to determine whether a preamble pattern is detected in the received signal. After the receiving device 204 successfully receives the payload 214, the receiving device 204 transmits a selective acknowledgement (SACK) frame 216 to the transmitting device 202.

In FIG. 2, because of the robust transmission of the delimiters (e.g., the SOF delimiter 212, the SACK frame 216, etc.) the network devices in the local network (e.g., the local feature-capable transmitting device 206) may detect the SOF delimiter 212 transmitted by the transmitting device 202 in the neighbor network. In FIG. 2, the feature-capable devices in the local network and the neighbor network determine to reuse the channel. As depicted in FIG. 2, the local feature-capable transmitting device 206 also transmits priority symbols in the PRS slots 218 (e.g., at the same time as the transmitting device 202 in the neighbor network). The local feature-capable transmitting device 206 initiates a back-off time interval 220 (e.g., in accordance with CSMA channel contention procedures described above). During the back-off time interval 220, the local feature-capable transmitting device 206 detects the SOF delimiter 212 transmitted in the neighbor network. However, because the local feature-capable transmitting device 206 determined to reuse the channel with the neighbor network, the local feature-capable transmitting device 206 can ignore the SOF delimiter 212. After the back-off time interval 220 elapses, the local feature-capable transmitting device 206 can initiate its frame transmission by transmitting its SOF delimiter 222 and a payload 224, thus reusing the channel with the neighbor network. As depicted in FIG. 2, the transmissions of the local feature-capable transmitting device 206 in the local network overlap with the transmissions of the transmitting device 202 and the receiving device 204 in the neighbor network. It is noted that if the feature-capable devices in the local network and the neighbor network determine to share the communication channel, the, in response to detecting the SOF delimiter 212 in the neighbor network, the local transmitting device 206 can defer channel access (and defer the transmission of SOF delimiter 222 and payload 224) until the transmission of SOF delimiter 212 and payload 214 initiated by the neighbor network is completed.

Figure 3:
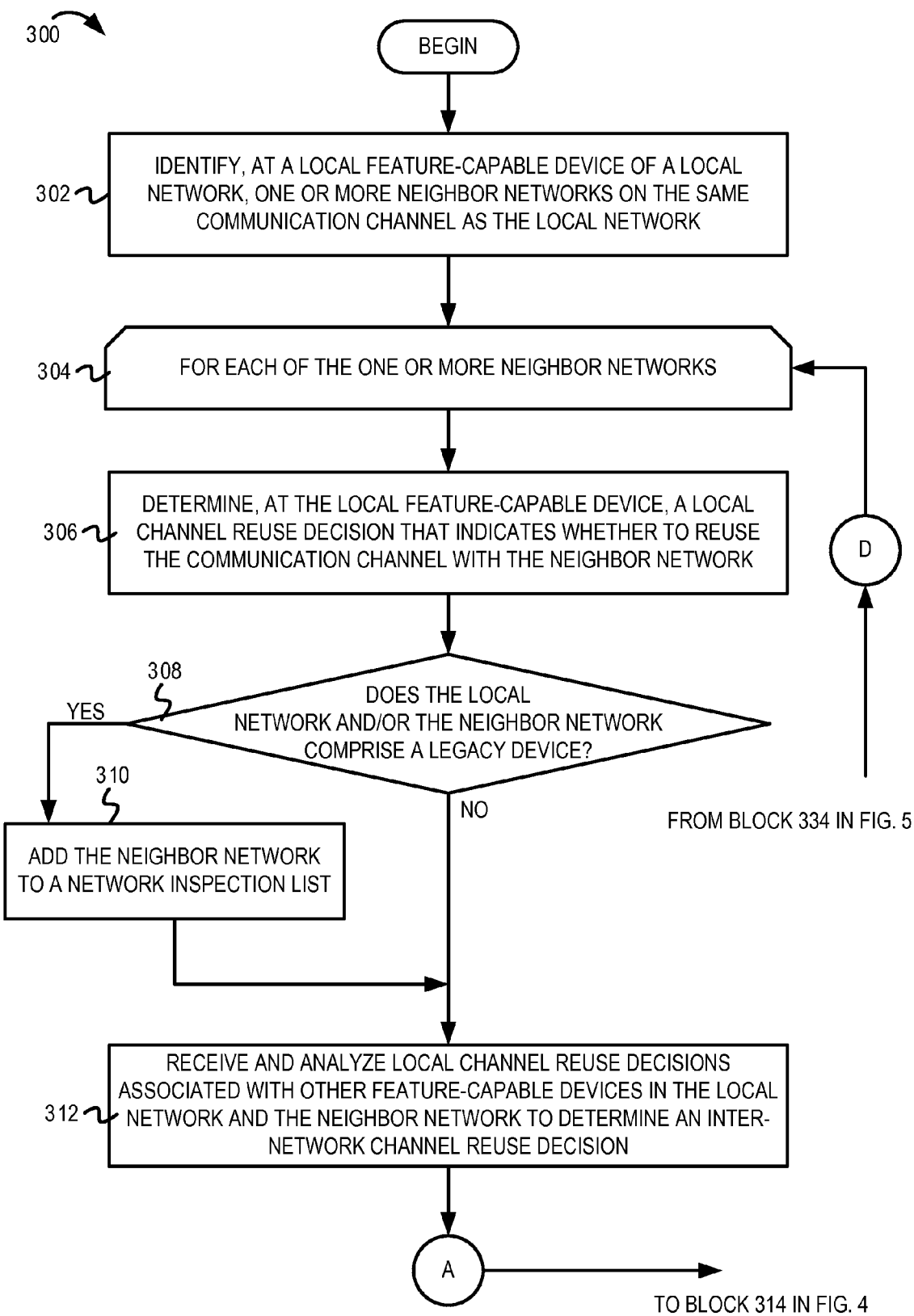
FIG. 3 is a flow diagram illustrating example operations for determining whether to reuse a channel with a neighbor network.
Figure 4:
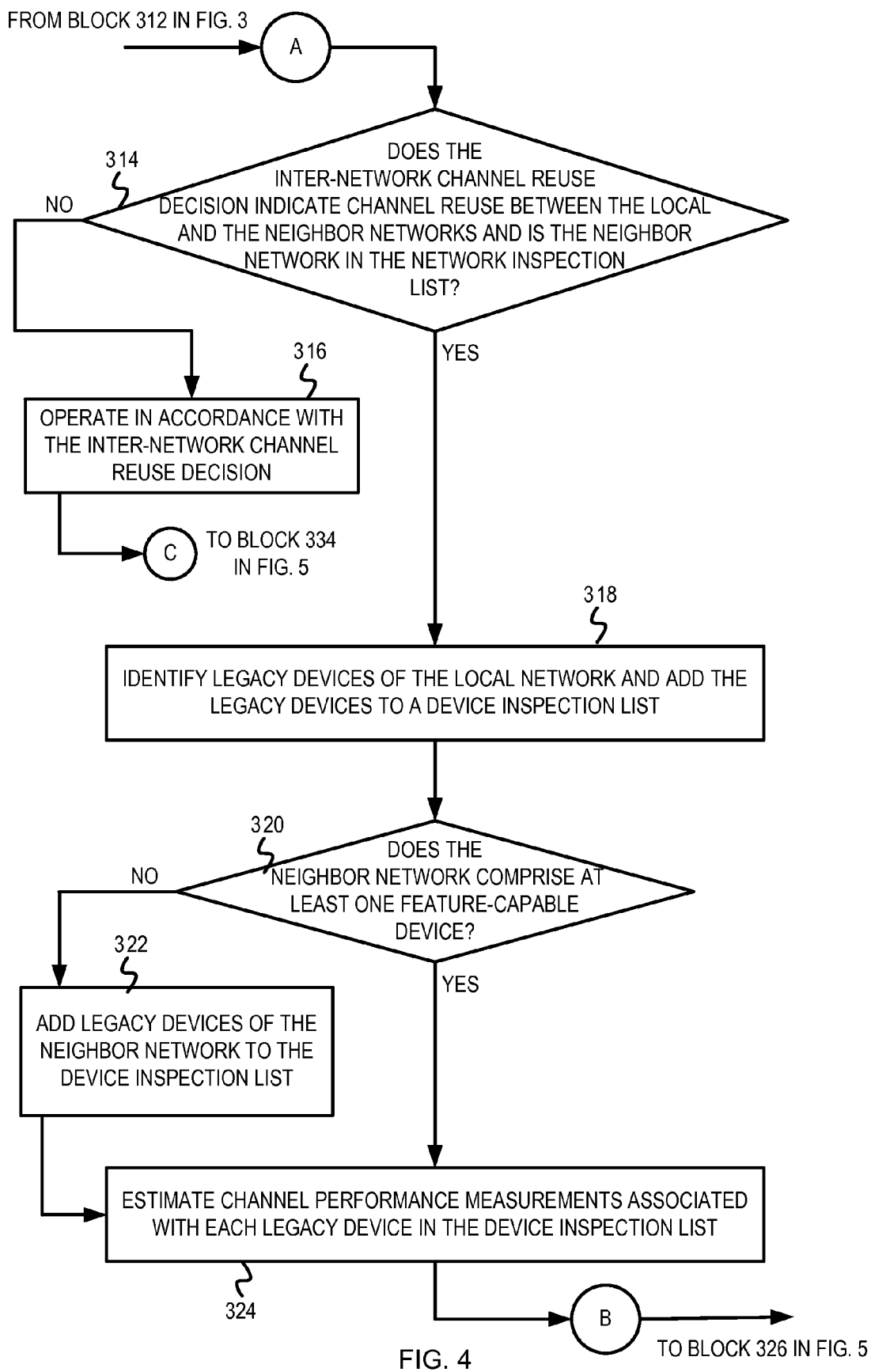
FIG. 4 is a continuation of FIG. 3 and also illustrates example operations for determining whether to reuse a channel with a neighbor network.
Figure 5:
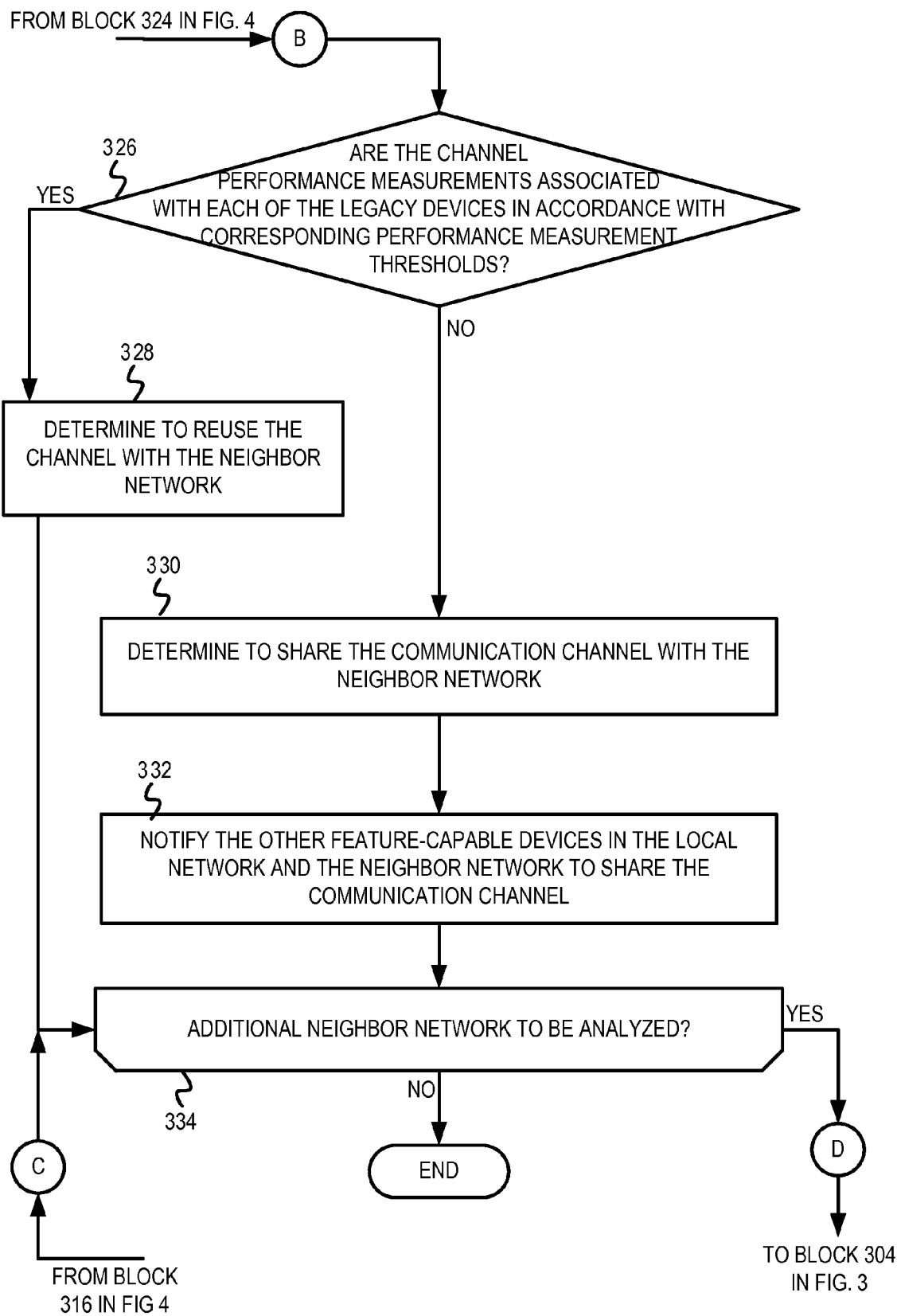
FIG. 5 is a continuation of FIG. 4 and illustrates example operations for determining whether to reuse a channel with a neighbor network.

FIGS. 3, 4, and 5 depict a flow diagram ("flow") 300 illustrating example operations for determining whether to reuse a channel with a neighbor network. The flow 300 begins at block 302 in FIG. 3.

At block 302, a local feature-capable device of a local network identifies one or more neighbor networks on the same communication channel as the local network. With reference to the example of FIG. 1, the local feature-capable device 104 (e.g., the channel reuse decision unit 116) can execute operations described below in blocks 304-332 in FIGS. 3-5 for each neighbor network to determine whether to reuse or share the channel ("channel reuse decision") with the neighbor network and to coordinate the channel reuse decision with other network devices in the local network and the neighbor network. The flow continues at block 304.

At block 304, a loop begins for each of the one or more neighbor networks on the shared communication channel. For example, the channel reuse decision unit 116 can select a neighbor network for analysis and execute the operations in blocks 304-332 in FIGS. 3-5 to determine and coordinate a channel reuse decision with the neighbor network. The flow continues at block 306.

At block 306, the local feature-capable device determines a local channel reuse decision that indicates whether to reuse the communication channel with the neighbor network. For example, the channel reuse decision unit 116 can determine signal strength information about each network device in the neighbor network. As discussed above, the channel reuse decision unit 116 can detect a start of frame (SOF) delimiter and determine information such as a data transmission rate at which frames are transmitted to a receiving device. The channel reuse decision unit 116 can then detect an acknowledgement frame from the receiving device and can determine information such as a packet/bit error rate, a number of transmission successes/failures, etc. Based on this information, the channel reuse decision unit 116 can infer the quality of the channel and can determine whether to reuse the channel with the neighbor network 108. The channel reuse decision unit 116 can also determine whether to reuse or share the channel with the neighbor network 108 depending on the inter-network attenuation (e.g., attenuation between the local network 102 and the neighbor network 108), intra-network attenuation (e.g., attenuation between network devices 104 and 106 within the local network 102 and/or the attenuation between network devices 110 and 112 within the neighbor network 108), etc. For example, if the intra-network attenuation is low (e.g., 30 dB) and the inter-network attenuation is higher (e.g., 60 dB), the channel reuse decision unit 116 can determine to reuse the channel with the neighbor network 108. As another example, if the intra-network attenuation is higher than or approximately equal to the inter-network attenuation, the channel reuse decision unit 116 can determine to share the channel with the neighbor network 108. The flow continues at block 308.

At block 308, it is determined whether the local network and/or the neighbor network comprise a legacy device. The legacy device may not support and execute functionality for reusing the communication channel with the neighbor network. As discussed above with reference to stage A of FIG. 1, the local feature-capable device 104 can broadcast one or more messages in the local network 102 and/or can broadcast one or more multi-network messages to detect the presence of legacy devices. If it is determined that the local network 102 and/or the neighbor network 108 comprise a legacy device, the flow continues at block 310. Otherwise, if it is determined that neither the local network 102 nor the neighbor network 108 comprise a legacy device, the flow continues at block 312.

At block 310, the neighbor network is added to a network inspection list. The flow 300 moves from block 308 to block 310 if the channel reuse decision unit 116 determines that the local network 102 and/or the neighbor network 108 comprise a legacy device. In some embodiments, the channel reuse decision unit 116 can record an indication of the neighbor network (e.g., a network identifier) in a network inspection list (e.g., a table, a predetermined memory location, etc.). Adding the neighbor network 108 to the network inspection list can indicate that the channel reuse decision unit 116 should re-evaluate the channel reuse decision associated with the neighbor network to ensure that the performance of the legacy devices (in the local network 102 and/or the neighbor network 108) remains in accordance with performance thresholds if the local network 102 and the neighbor network 108 reuse the channel. The flow continues at block 312.

At block 312, local channel reuse decisions associated with other feature-capable devices in the local network and the neighbor network are analyzed to determine an inter-network channel reuse decision. For example, the channel reuse decision unit 116 can receive local channel reuse decisions determined by other feature-capable devices in the local network 102 and by feature-capable devices 110 in the neighbor network 108. Based on analyzing the received local channel reuse decision and the local channel reuse decision determined at block 306, the channel reuse decision unit 116 can determine the inter-network channel reuse decision. The inter-network channel reuse decision can be a coordinated, consistent decision among all the feature-capable devices in the local and neighbor networks. In some embodiments, the inter-network channel reuse decision can indicate that the local network 102 and the neighbor network 108 should reuse the channel only if all the feature-capable devices in the local network 102 and the neighbor network 108 independently determine to reuse the channel. In some embodiments, if at least one of the feature-capable devices determines to share the channel, the inter-network channel reuse decision can indicate that the local network 102 and the neighbor network 108 should share the channel. It is noted that the channel reuse decision unit 116 can also transmit (e.g., in a multi-network broadcast message, or another suitable message) an indication of the local channel reuse decision (e.g., determined at block 306) to other feature-capable devices in the local network 102 and the neighbor network 108 to enable the other feature-capable devices determine the inter-network channel reuse decision. The flow continues at block 314 in FIG. 4.

At block 314, it is determined whether the inter-network channel reuse decision indicates channel reuse between the local and the neighbor networks and whether the neighbor network is in the network inspection list. As discussed above, if the local network 102 and/or the neighbor network 108 comprise a legacy device, the performance of the legacy device may be affected if the feature-capable devices in the local network 102 and the neighbor network 108 reuse the channel. If the inter-network channel reuse decision does not indicate channel reuse and/or if the neighbor network is not in the network inspection list, the flow continues at block 316. If the inter-network channel reuse decision indicates channel reuse and if the presence of a legacy device is detected, the flow continues at block 318. The channel reuse decision unit 116 can execute operations described in blocks 318-332 in FIGS. 4 and 5 to re-evaluate the inter-network channel reuse decision (that the local and neighbor networks should reuse the channel) based on the performance of each legacy device in local network 102 and/or the neighbor network 108 and to ensure that the performance of the legacy device remains in accordance with performance thresholds during channel reuse. The final inter-network channel reuse decision can be determined after the re-evaluation procedure is completed.

At block 316, the feature-capable device of the local network operates in accordance with the inter-network channel reuse decision. For example, if the inter-network channel reuse decision indicates that the local network 102 and the neighbor network 108 should share the channel, the feature-capable device 104 can defer its transmissions in response to detecting transmissions (e.g., SOF delimiters, etc.) initiated in the neighbor network 108. As another example, if the inter-network channel reuse decision indicates that the local network 102 and the neighbor network 108 should reuse the channel, the feature-capable device 104 may not defer its transmissions (i.e., may initiate its transmissions) even if transmissions (e.g., SOF delimiters, etc.) are detected in the neighbor network 108. From block 316, the flow continues at block 334 in FIG. 5, where a next neighbor network (if any) is identified and analyzed.

At block 318, legacy devices of the local network are identified and are added a device inspection list associated with the feature-capable device. The flow 300 moves from block 314 to block 318 if it is determined that the inter-network channel reuse decision indicates channel reuse between the local and the neighbor networks and if the neighbor network is in the network inspection list (i.e., if the neighbor network and/or the local network comprise a legacy device). In some embodiments, the channel reuse decision unit 116 can record an indication of each legacy device in the local network 102 (e.g., a device identifier) in the device inspection list (e.g., a table, a predetermined memory location, etc.). Adding the legacy device to the device inspection list can indicate that the channel reuse decision unit 116 should evaluate the channel condition of the legacy device 106 to ensure that the performance of the legacy device 106 remains in accordance with performance thresholds if the local network 102 and the neighbor network 108 reuse the channel. The flow continues at block 320.

At block 320, it is determined whether the neighbor network comprises at least one feature-capable device. In some embodiments, the channel reuse decision unit 116 can determine that the neighbor network 108 comprises a feature-capable device 110 if the channel reuse decision unit 116 detects one or more messages (indicating the presence of a feature-capable device) from the neighbor network 108. In another embodiment, the local feature-capable device 104 can broadcast a request message requesting identification information from any feature-capable devices that receive the request message. If the local feature-capable device 104 receives a response message with appropriate identification information from the neighbor network 108, it may be inferred that the neighbor network 108 comprises a feature-capable device 110. If the local feature-capable device 104 does not receive a response message from the neighbor network 108 or if the local feature-capable device 104 receives a response message with incorrect information from the neighbor network 108, it may be inferred that the neighbor network 108 does not comprise any feature-capable devices. If the neighbor network 108 comprises at least one feature-capable device, the flow continues at block 324. Otherwise, if the neighbor network 108 does not comprise any feature-capable devices, the flow continues at block 322.

At block 322, legacy devices of the neighbor network are added to the device inspection list associated with the local feature-capable device. The flow 300 moves from block 320 to block 322 if the neighbor network 108 does not comprise any feature-capable devices. If the neighbor network 108 does not comprise any feature-capable devices, then: 1) the neighbor network 108 only comprises legacy devices and 2) the neighbor network 108 does not comprise a feature-capable device to evaluate the channel condition of the legacy devices of the neighbor network and to determine whether the performance of the legacy devices will be affected by channel reuse. Therefore, the local feature-capable device 104 (e.g., the channel reuse decision unit 116) can record an indication of each legacy device 112 in the neighbor network 108 (e.g., a device identifier) in the device inspection list. Adding the legacy device 112 to the device inspection list can indicate that the channel reuse decision unit 116 should evaluate the channel condition of the legacy device 112 of the neighbor network 108 to ensure that the performance of the neighbor network 108 remains in accordance with performance thresholds if the local network 102 reuses the channel with the neighbor network 108. It is noted that if the neighbor network 108 comprises at least one feature-capable device 110, it may be assumed that the feature-capable device 110 in the neighbor network 108 will execute the operations described in blocks 324-334 for the legacy devices of the neighbor network 108. The flow continues at block 324.

At block 324, channel performance measurements are estimated for each legacy device in the device inspection list. The channel performance measurements can comprise a data transmission rate, a bit error rate (BER) determined for the channel, a packet error rate (PER) determined for the channel, an attenuation level, and other suitable channel performance measurements. For example, for each legacy device in the device inspection list, the channel reuse decision unit 116 can estimate the channel condition at the legacy device by inspecting each detected SOF delimiter and SACK frame transmitted/received by the legacy device. The channel reuse decision unit 116 can extract bit loading estimate (BLE) information and acknowledgement information from the detected SOF delimiter and SACK frame respectively. The channel reuse decision unit 116 can determine the modulation and coding scheme used by the transmitting device and the transmission success/failure statistics at the receiving device. Based on this information, the channel reuse decision unit 116 can estimate the channel performance measurements at the legacy device. In some embodiments, the channel reuse decision unit 116 may allocate a predetermined inspection time interval for estimating the channel performance measurements associated with the legacy devices. The length of the inspection time interval can be selected to ensure that the channel reuse decision unit 116 can collect enough samples of delimiters to estimate (with a high confidence) the channel performance measurements at each legacy device. The length of the inspection time interval can also be selected to ensure that, for a pair of transmitting and receiving devices, a channel adaptation module has sufficient time to adjust the modulation and coding scheme.

As discussed above, if all the network devices in the neighbor network are legacy devices, the local feature-capable device 104 (e.g., the channel reuse decision unit 116) can evaluate the channel performance of the legacy devices in the neighbor network 108. The channel reuse decision unit 116 can inspect the detected SOF delimiter and SACK frame from the neighbor network 108, estimate the channel performance at the corresponding legacy devices in the neighbor network 108, and determine if the performance of the legacy device in the neighbor network 108 will be significantly affected when channel is reused by the local and the neighbor networks. In one embodiment, if the local and the neighbor networks synchronize their channel access, the channel reuse decision unit 116 may detect an insufficient number of SOF delimiters and/or SACK frames during the inspection time interval. In this embodiment, the channel reuse decision unit 116 may allocate a longer inspection time interval to detect a sufficient number of delimiters (i.e., SOF delimiters and SACK frames) to estimate the channel performance associated with each legacy device in the neighbor network 108.

In some implementations, the channel reuse decision unit 116 can divide the inspection time interval into a channel reuse time interval and a channel share time interval. The channel reuse decision unit 116 can reuse the channel with the neighbor network 108 during the channel reuse time interval and can share the channel with the neighbor network 108 during the channel share time interval. During the channel share time interval, the channel reuse decision unit 116 can extract the BLE information of each SOF delimiter detected from the neighbor network 108 and can track the change of transmission rate for a pair of transmitting and receiving devices. If the transmission rate does not change by a significant amount (e.g., if the change is transmission rate is less than a threshold deviation), the channel reuse decision unit 116 may infer that the channel performance of the receiving (legacy) device is not affected by channel reuse. Because the channel accesses of the local and neighbor networks may be synchronized during the channel share time interval, the channel reuse decision unit 116 may require less time to collect a sufficient number of samples from the legacy devices in the neighbor network 108. After the channel performance measurements associated with the legacy devices are determined, the flow continues at block 326 in FIG. 5.

At block 326, it is determined whether the channel performance measurements associated with each of the legacy devices are in accordance with corresponding performance measurement thresholds. For each legacy device in the device inspection list, the channel reuse decision unit 116 can determine (based on the channel performance measurements associated with the legacy device) whether the performance of the legacy device will deteriorate if the local network 102 and the neighbor network 108 reuse the channel. For example, if the number of consecutive data transmission failures determined (e.g., from the acknowledgement information in the SACK frame) during the inspection time interval exceeds a maximum permitted number of transmission failures, the channel reuse decision unit 116 may infer that the legacy device has poor channel performance because of strong interference from the neighbor network 108. As another example, the average transmission rate (e.g., determined based on BLE information in each detected SOF delimiter) and the number of transmission successes (e.g., determined based on the data transmission feedback in each detected SACK frame) can be used to evaluate the channel performance at the legacy device. As another example, channel adaptation information can be used to evaluate the channel performance of the legacy device. In this example, the local feature-capable device 104 (e.g., the channel reuse decision unit 116) can "overhear" channel adaptation indication management messages received by the legacy device. The local feature-capable device 104 can extract tone map information from the management messages and can estimate the channel performance at the legacy device. If it is determined that the channel performance measurements associated with all the legacy devices are in accordance with corresponding performance measurement thresholds, the flow continues at block 328. Otherwise, if it is determined that the channel performance measurement associated with at least one of the legacy devices is not in accordance with the corresponding performance measurement threshold, the flow continues at block 330.

At block 328, the local feature-capable device determines that the local network and the neighbor network should reuse the communication channel. The flow 300 moves from block 326 to block 328 if the channel performance measurements associated with all the legacy devices (in the local and neighbor networks) are in accordance with corresponding performance measurement thresholds. The channel reuse decision unit 116 can determine that reusing the channel with the neighbor network 108 will not impair the performance of any legacy devices 106 and 112 in the local network 102 and/or the neighbor network 108. The channel reuse decision unit 116 can notify other processing components of the local feature-capable device 104 to reuse the channel with the neighbor network 108. The flow continues at block 334, where a next neighbor network (if any) is identified and analyzed.

At block 330, the local feature-capable device determines that the local network and the neighbor network should share the communication channel. The flow 300 moves from block 326 to block 330 if the channel performance measurements associated with at least one legacy device (in the local and/or neighbor networks) are not in accordance with corresponding performance measurement thresholds. The channel reuse decision unit 116 can determine that reusing the channel with the neighbor network 108 with impair the performance of at least one legacy device in the local network 102 and/or the neighbor network 108. The channel reuse decision unit 116 can revoke the inter-network channel reuse decision determined at block 312 (e.g., for reusing the channel) and can determine that the local network 102 and the neighbor network 108 should share the communication channel (e.g., in accordance with conventional CSMA protocols). The flow continues at block 332.

At block 332, the other feature-capable devices in the local network and the neighbor network are notified to share the communication channel. The local feature-capable device 104 can coordinate the updated channel reuse decision (i.e., to share the channel with the neighbor network) with other feature-capable devices in the local network 102 and the neighbor network 108 to reach a consistent inter-network channel reuse decision in the local network and the neighbor network. The flow continues at block 334.

At block 334, it is determined whether additional neighbor networks are to be analyzed. If it is determined that additional neighbor networks are to be analyzed, the flow continues at block 304 in FIG. 3, where a next neighbor network (for the local network) is identified and operations described above in blocks 306-332 in FIGS. 3-5 are executed to determine whether the local network should share or reuse the channel with the next neighbor network. After all the neighbor networks are analyzed and inter-network channel reuse decisions are made for all the neighbor networks, the flow ends.

Figure 6:
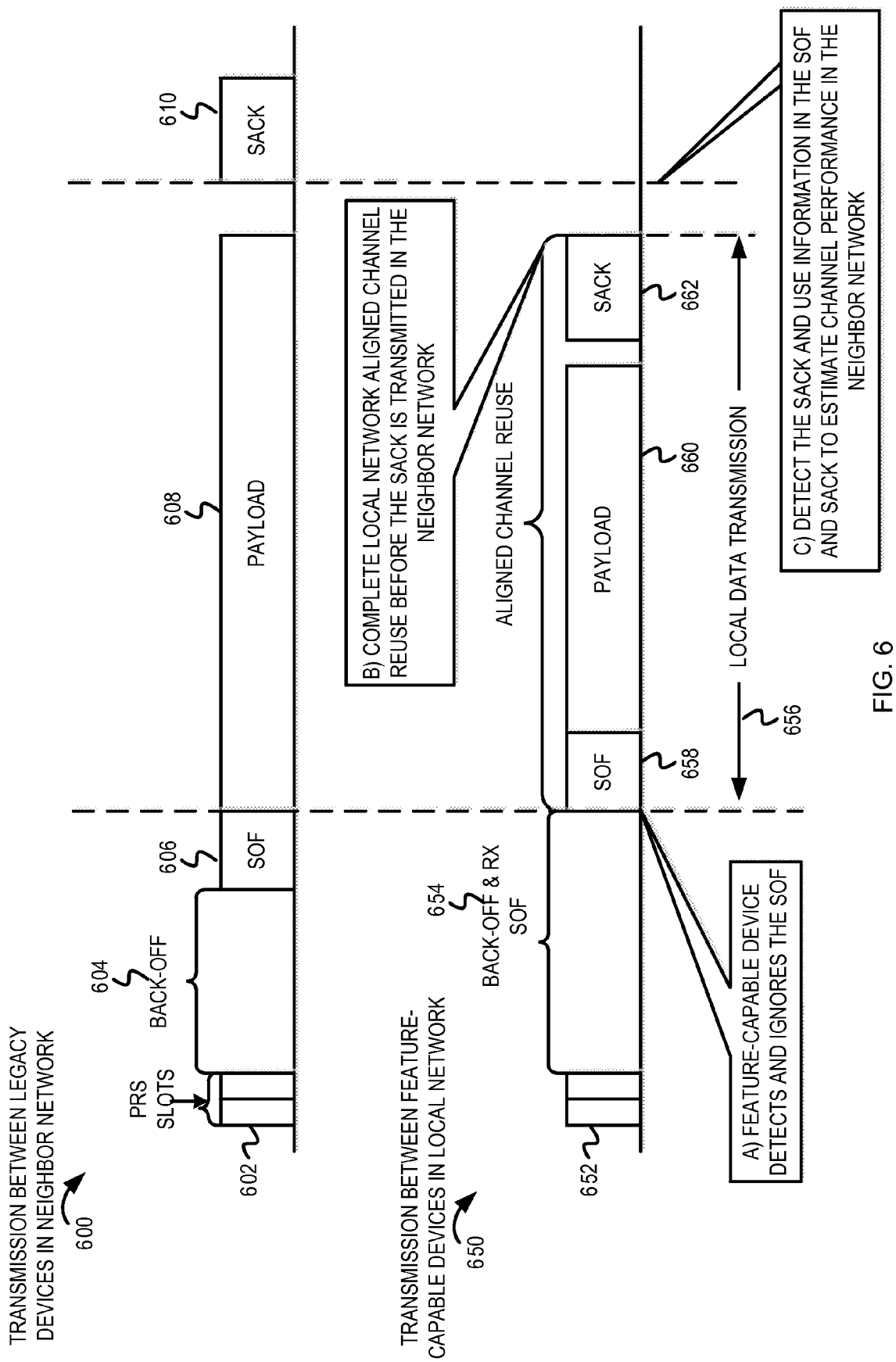
FIG. 6 is a timing diagram illustrating one example embodiment for aligned channel reuse.

FIGS. 6-7 will illustrate how the local feature-capable device 104 can efficiently estimate the channel performance of legacy devices, depending on the types of network devices in the local and neighbor networks. More specifically, FIG. 6 illustrates a scenario where the local network 102 only comprises feature-capable devices and the neighbor network 108 only comprises legacy devices. FIG. 7 illustrates a scenario where the local network comprises both feature-capable devices and legacy devices, the neighbor network only comprises legacy devices, and the legacy devices in the neighbor network are configured to transmit packet bursts.

In some embodiments, as depicted in FIG. 6, the local network 102 may only comprise feature-capable devices, while the neighbor network may only comprise legacy devices. In this embodiment, the feature-capable devices in the local network 102 ("local feature-capable devices) can execute "aligned channel reuse" operations to use the channel for local communications and to evaluate the performance of the legacy devices in the neighbor network 108, as depicted in FIG. 6. In other words, the operations described with reference to FIG. 6 may be executed while the local feature-capable device 104 is evaluating the current channel reuse decision (to reuse the channel with the neighbor network). In FIG. 6, the timing diagram 600 illustrates a transmission between a transmitting legacy device and a receiving legacy device in the neighbor network 108. The timing diagram 650 illustrates a transmission between a transmitting feature-capable device and a receiving feature-capable device in the local network 102. The transmitting legacy device in the neighbor network 108 transmits priority information in the PRS slots 602, initiates a back-off time interval 604, and then transmits a frame including a start of frame (SOF) delimiter 606 and a payload 608. The transmitting feature-capable device in the local network 102 also determines to transmit a frame to a receiving feature-capable device in the local network 102. The transmitting feature-capable device transmits priority information in the PRS slots 652 and initiates a back-off time interval 654. During the back-off time interval 654, the transmitting feature-capable device detects the SOF delimiter 606 in the neighbor network (see stage A). The transmitting feature-capable device can operate in accordance with the current channel reuse decision (determined at block 314 of FIG. 4) to reuse the channel with the neighbor network 108 and can align its data transmission 656 with the data transmission in the neighbor network 108. Specifically, the transmitting feature-capable device can determine the length of the neighbor network transmission based on information in the detected SOF delimiter 606. The transmitting feature-capable device can execute aligned channel reuse operations by controlling the transmission duration of its data transmission 656 so that its transmission duration is shorter than the transmission duration of the neighbor network's data transmission. The transmitting feature-capable device can ensure that it transmits the SOF delimiter 658 and the payload 660 and receives a SACK frame 662 (from the receiving feature-capable device) before the receiving legacy device in the neighbor network transmits the SACK frame 610 (see stage B). By ensuring that the data transmission 656 between the feature-capable devices in the local network 102 is completed before the SACK frame 610 is exchanged between legacy devices in the neighbor network 102, the feature-capable device (in the local network) can overhear the SACK frame 610, extract the acknowledgement information from the SACK frame 610, and estimate the channel performance at the legacy device (that transmitted the SACK frame 610), as depicted at stage C. In addition to extracting information about the neighbor network from the SACK frame 610, the feature-capable device can also overhear the SOF delimiter 606, extract BLE information from the SOF frame 610, and use this information to estimate the channel performance at the legacy device (that transmitted the SACK frame 610).

In some embodiments, as depicted in FIG. 7, the local network 102 may comprise at least one legacy device (in addition to at least one feature-capable device) while the neighbor network may 108 only comprise legacy devices. Furthermore, the legacy devices in the neighbor network 108 may be configured to transmit multiple packets in a packet burst before soliciting (or receiving) a SACK frame. In other words, a transmitting legacy device in the neighbor network 108 may transmit multiple packets to a receiving legacy device and the receiving legacy device may transmit an acknowledgement after receiving a predetermined number of packets. For example, when communicating a packet burst of 10 packets, the receiving legacy device may transmit one acknowledgement message after receiving the 10 packets (instead of transmitting 10 acknowledgement messages for corresponding 10 packets). In this embodiment, the local feature-capable device 104 in the local network 102 can execute "aligned channel reuse" operations to use the channel for local communication and to evaluate the performance of the legacy devices in the neighbor network 108, when the neighbor network transmits packet bursts, as depicted in FIG. 7. The operations described with reference to FIG. 7 may be executed while the local feature-capable device 104 is evaluating the current channel reuse decision (to reuse the channel with the neighbor network 108).

In FIG. 7, the timing diagram 700 illustrates a transmission between a transmitting legacy device and a receiving legacy device in the neighbor network 108. The timing diagram 750 illustrates transmissions of a transmitting local feature-capable device 104 in the local network 102. The timing diagram 780 illustrates transmissions of a local legacy device 106 in the local network 102. The transmitting legacy device in the neighbor network 108 transmits priority information in the PRS slots 702, initiates a back-off time interval 704, and then transmits a data packet burst 706. The data packet burst 706 can comprise any suitable number of packets. In this example of FIG. 7, the data packet burst comprises three packets including a first SOF delimiter 708, a first payload 710, a second SOF delimiter 712, a second payload 714, a third SOF delimiter 716, and a third payload 718. The transmitting legacy device then receives a SACK frame 720 from the receiving legacy device in the neighbor network 108. Referring to the timing diagram 750, the local feature-capable device 104 transmits priority information in the PRS slots 752 and initiates a back-off time interval 754. During the back-off time interval 754, the local feature-capable device 104 detects the first SOF delimiter 706 in the neighbor network 108. Likewise, referring to the timing diagram 780, the local legacy device 106 transmits priority information in the PRS slots 782 and initiates a back-off time interval 784. During the back-off time interval 784, the local legacy device 106 detects the first SOF delimiter 706 in the neighbor network 108. The local legacy device 106 operates in accordance with conventional CSMA procedures, executes virtual carrier sensing operations, and defers channel access operations for the duration 786 that the first payload 608 is transmitted in the neighbor network 108 (see stage A). Because the local feature-capable device 104 is scheduled to communicate with the local legacy device 106 and because the local legacy device 106 has already deferred channel access operations, the local feature-capable device 104 can defer channel reuse for the duration 786 that the first payload 608 is transmitted in the neighbor network 108 (see stage B).

In some embodiments as depicted in FIG. 7, after transmission of the first data packet (e.g., the first SOF delimiter 708 and the first payload 710) is completed in the neighbor network 108, the local feature-capable device 104 can operate in accordance with the current channel reuse decision (determined at block 314 of FIG. 4) to reuse the channel with the neighbor network 108. In some embodiments, as depicted in FIG. 7, the local feature-capable device 104 can request data transmission from the local legacy device 106 by transmitting a local SOF delimiter 756 and permitting bi-directional bursting. The local feature-capable device 104 can transmit the local SOF delimiter 756 to coincide with the transmission of the second SOF delimiter 712 in the neighbor network (see stage C). The local legacy device 106 can detect the local SOF delimiter 756 transmitted by the local feature-capable device 104 (e.g., because of a stronger signal strength as compared to the second SOF delimiter 712 in the neighbor network 108) and can lock onto the transmissions of the local feature-capable device 104. The local legacy device 106 can transmit its data on the reverse channel. As depicted in FIG. 7, the local legacy device 106 can transmit a reverse start of frame (RSOF) delimiter 788 and a payload 790 (see stage D). The bi-directional bursting in the local network 102 may take place several times until a predetermined time interval before the data packet burst 706 in the neighbor network 108 ends. In other words, the local legacy device 106 may transmit multiple packets (comprising an RSOF and a payload) to the local feature-capable device 104 and/or may receive multiple packets from the local feature-capable device 104 while the data packet burst 706 is being transmitted in the neighbor network 108. It is noted that in other embodiments, the local feature-capable device 104 may not request data packets from the local legacy device 106. Instead, the local feature-capable device 104 may transmit one or more data packets to the local legacy device 106 while the neighbor network 108 is transmitting the data packet burst 706. When the local feature-capable device 104 determines that the neighbor network 108 will finish transmitting the data packet burst 706 (e.g., just before transmission of the last packet in the packet burst ends), the local feature-capable device 104 can transmit a NULL delimiter 758 (e.g., or another suitable "abort transmission" packet) to cause the local legacy device 106 to abort channel access. In some embodiments, the local feature-capable device 104 can determine a number of packets that will be transmitted (in the packet burst) in the neighbor network 108, the transmission time, and a time instant at which the transmitting legacy device in the neighbor network 108 will finish transmitting the last packet 718 based, at least in part, on the information in the first SOF delimiter 708. Accordingly, a predetermined time interval before the last packet 718 in the data packet burst 706 is transmitted in the neighbor network 108, the local feature-capable device 104 can broadcast the NULL delimiter 758 in the local network 102 (see stage E). The local legacy device 106 can detect the NULL delimiter 758, stop its data transmission, abort channel access operations, and try to synchronize to the channel by searching for a delimiter on the shared communication medium.

The local legacy devices 106 and the local feature-capable devices 104 in the local network 102 can detect the SACK frame 720 in the neighbor network (see stage F). Reception of the SACK frame 720 (transmitted in the neighbor network 108) in the local network 102 can terminate the aligned channel reuse operations between the local network 102 and the neighbor network 108. By ensuring that the data transmissions of the local legacy device 106 are completed/aborted before the SACK frame 720 is transmitted in the neighbor network, the local feature-capable device 104 can overhear the SACK frame 720, extract the data transmission feedback from the SACK frame 720, and estimate the channel performance at the legacy device (that transmitted the SACK frame 720). In addition, the feature-capable device can also extract BLE information from the first SOF delimiter 708 (and/or the subsequent SOF delimiters 712 and 716) and use this information to estimate the channel performance at the legacy device (that transmitted the SACK frame 720).

Figure 8A:
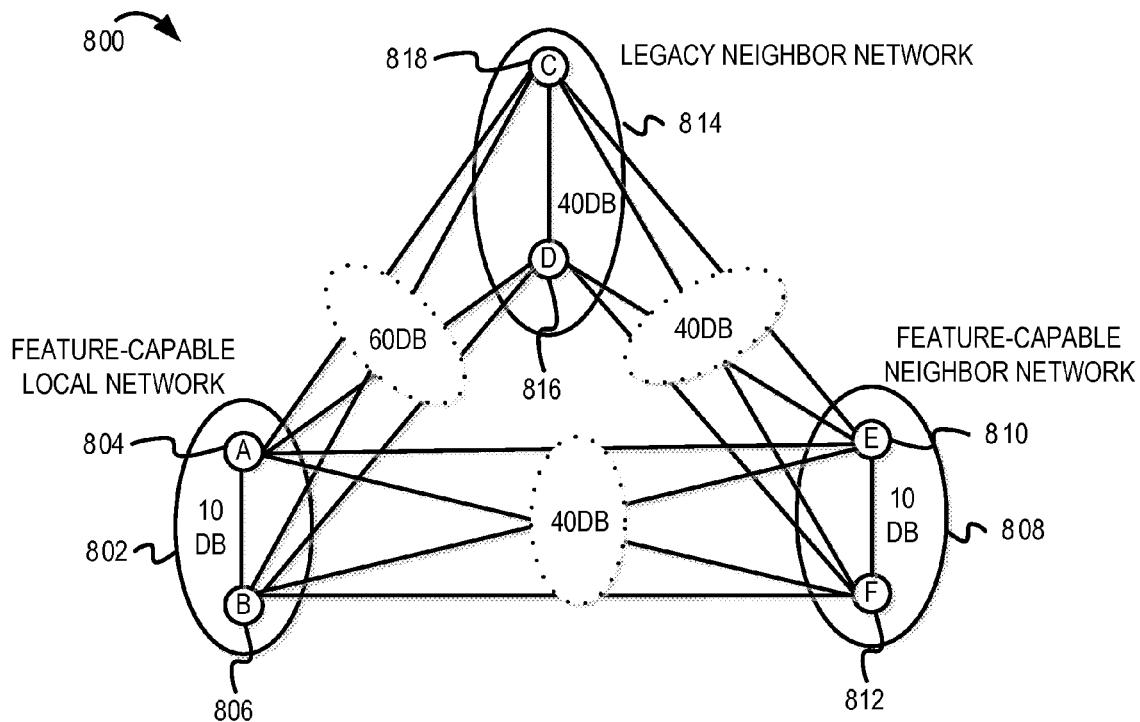
FIG. 8A is an example conceptual diagram illustrating a local network associated with multiple neighbor networks.

In some embodiments, as depicted in FIG. 8A, a local network may be associated with multiple neighbor networks, which may attempt to reuse the channel at the same time. For example, a feature-capable local network 802 may only comprise feature-capable devices 804 and 806. The local network 802 may have two neighbor networks—a feature-capable neighbor network 808 and a legacy neighbor network 814. The feature-capable neighbor network 808 may comprise only feature-capable devices 810 and 812; while the legacy neighbor network 814 may only comprises legacy devices 816 and 818. As discussed above with reference to FIGS. 3-5, the feature-capable local network 802 and the feature-capable neighbor network 808 may each determine to reuse the channel with each other and also with the legacy neighbor network 814. As discussed with reference to blocks 324-332 of FIGS. 4-5, the feature-capable local network 802 and the feature-capable neighbor network 808 may then analyze the channel performance of the legacy devices of the legacy neighbor network 814 to ensure that the performance of the legacy devices 816 and 818 remains in accordance with performance thresholds during channel reuse. When, for example, the local feature-capable device 804 evaluates the current channel reuse decision with respect to a target legacy device 818 and the performance of the target legacy device 818 is deemed to be significantly affected by channel reuse, the local feature-capable device 804 may need to determine whether the performance degradation of the target legacy device 818 is because of transmissions by the local feature-capable device 804 or because of transmissions within the feature-capable neighbor network 808. As depicted in FIG. 8A, the attenuation between the feature-capable network 802 and the legacy network 814 is 60 dB; while the attenuation between the feature-capable network 808 and the legacy network 814 is 40 dB. Therefore, if the feature-capable devices 804 and 810 in the feature-capable local network 802 and the feature-capable neighbor network 808 respectively, execute aligned channel reuse operations (described in FIGS. 6 and 7) with the legacy device 816 at the same time, the SINR associated with the legacy device 816 may be very low because of the interference from the feature-capable device 810 rather than from the local feature-capable device 804 (e.g., based on the differences in attenuation between the networks). However, because the feature-capable device 804 also detects the poor transmission performance of the legacy device 816 by inspecting the SOF/SACK received/transmitted by the legacy device 816, the feature-capable device 804 may determine to share the channel with the legacy neighbor network 814. Consequently, all three networks 802, 808, and 814 may share the channel, resulting in a less optimal performance than if the local feature-capable network 802 had reused the channel with the legacy neighbor network 814 and shared the channel with the feature-capable neighbor network 808.

Figure 8B:
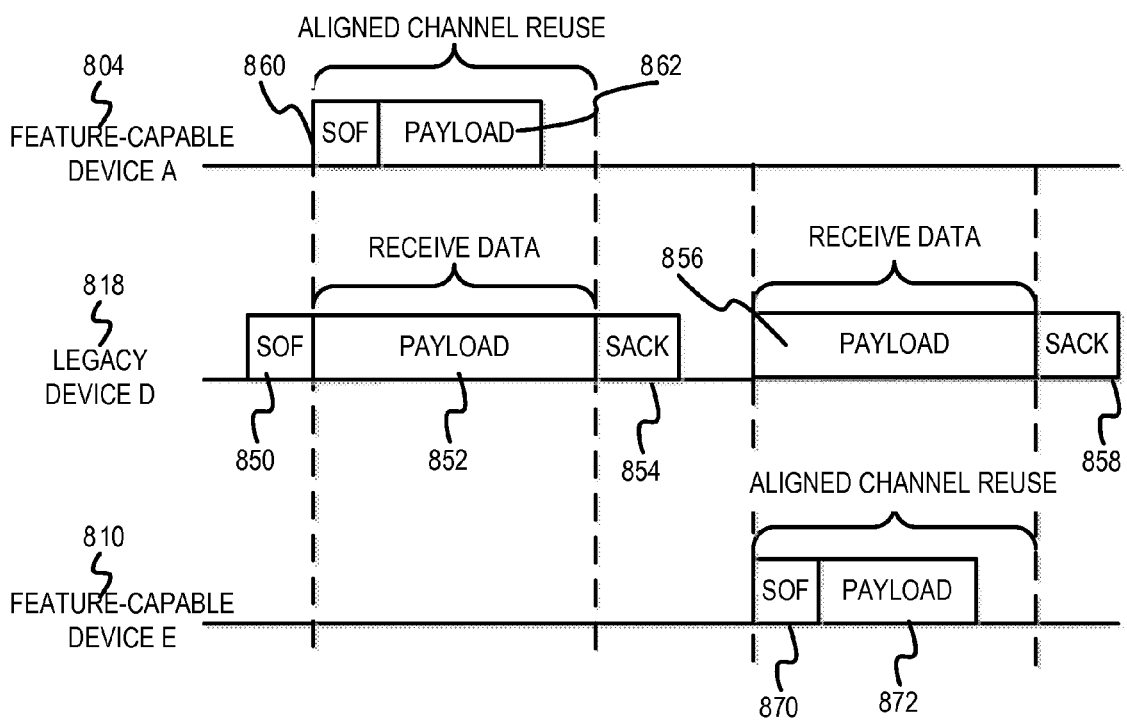
FIG. 8B is an example timing diagram illustrating coordination among multiple neighbor networks for aligned channel reuse.

In some embodiments, the feature-capable devices 804, 806, 810, and 812 can coordinate amongst themselves to ensure that they do not cause interference at the legacy devices (in-network legacy devices and legacy devices in neighbor networks). The feature-capable devices 804, 806, 810, and 812 can follow a schedule to execute the aligned channel reuse operations and inspect their respective local channel reuse decision with the legacy devices 816 and 818 to prevent simultaneously reusing the channel with feature-capable neighbor networks ("overlapped channel reuse"). Referring now to FIG. 8B, the feature-capable devices 804 and 810 can follow a schedule so that they do not evaluate the performance of the legacy device 818 (during channel reuse) at the same time and do not execute aligned channel reuse operations at the same time. Therefore, the feature-capable devices 804 and 810 can determine whether the channel condition at the legacy device 818 will be affected if the channel is reused between the legacy network 814 and their respective feature-capable networks 802 and 808.

In some embodiments, the schedule (according to which the feature-capable devices 804, 806, 810, and 812 analyze the performance of the legacy devices 816 and 818) can be pre-determined and assigned to the feature-capable devices 804, 806, 810, and 812 (e.g., by a network administrator, by one or more coordinating devices, etc.). In some embodiments, the feature-capable devices 804, 806, 810, and 812 can dynamically generate a distributed schedule. The distributed schedule may be generated based, at least in part, on the measured signal strength from the legacy device (e.g., the legacy device 818) to the feature-capable device (e.g., the feature-capable device 804) and the expected SINR at the legacy device 818. In some embodiments, if the difference between the expected SINR and the measured signal strength is large (e.g., greater than a predetermined threshold), the feature-capable device 804 may perform the aligned channel reuse operations with the legacy device 818 less frequently (e.g., a fewer number of times in the inspection time interval). However, if the difference between the expected SINR and the measured signal strength is small (e.g., less than the predetermined threshold), the feature-capable device 804 can perform the aligned channel reuse operations and evaluate the performance of the legacy device 818 more frequently (e.g., a larger number of times in the inspection time interval). If the feature-capable device 804 cannot determine when and how often to evaluate the performance of the legacy device 818 with respect to channel reuse, the feature-capable device 804 can evaluate the performance of the legacy device 818 in accordance with a default schedule (e.g., at one or more default time instants, after a default time interval, etc.).

In some embodiments, if the feature-capable devices 804 and 806 in the feature-capable network 802 detect an SOF delimiter transmitted by another feature-capable device in the neighbor network 808, the feature-capable devices 804 and 806 may not reuse the channel with the legacy neighbor network 814 until the next data transmission from the legacy neighbor network 814 is detected. As depicted in FIG. 8B, the legacy device 818 initiates a first data transmission (including an SOF delimiter 850 and a first payload 852) and receives a corresponding SACK frame 854. The feature-capable devices in the feature-capable networks 802 and 808 detect the SOF delimiter 850 transmitted in the legacy network 814. The feature-capable device 804 executes aligned channel reuse with the legacy device 818 and initiates a data transmission (including a SOF delimiter 860 and a payload 862) such that the feature-capable device 804 begins its transmission at/after the legacy device 818 begins transmission of the first payload 852. The feature-capable device 804 can ensure that its transmission (and possibly reception of a SACK frame, not depicted in FIG. 8B) ends before the legacy device 818 finishes transmitting its first payload 852. This can ensure that the feature-capable device 804 receives the SACK frame 854 transmitted in the legacy network 814 and evaluates the performance of the legacy device 818 (with respect to channel reuse) based on the information in the SOF delimiter 850 and the SACK frame 854. The legacy device 818 then initiates another data transmission (including a second payload 856) and receives a corresponding SACK frame 858. Although FIG. 8B depicts that the legacy device 818 does not transmit a second SOF delimiter before transmitting the second payload 856, in other embodiments, the legacy device 818 may transmit a second SOF delimiter prior to transmitting the second payload 856. During the second transmission, the feature-capable device 810 (of the feature-capable network 808) can execute aligned channel reuse with the legacy device 818 and can initiate a data transmission (including a SOF delimiter 870 and a payload 872) such that the feature-capable device 810 begins its transmission at/after the legacy device 818 begins transmission of the second payload 856. The feature-capable device 810 can ensure that its transmission (and possibly reception of a SACK frame, not depicted in FIG. 8B) ends before the legacy device 818 finishes transmitting its second payload 856. This can ensure that the feature-capable device 810 receives the SACK frame 858 transmitted in the legacy network 814 and evaluates the performance of the legacy device 818 (with respect to channel reuse) based on the information in the SOF delimiter 850 and the SACK frame 858. Thus, the feature-capable devices 804, 806, 810, and 812 can execute aligned channel reuse operations in accordance with a predetermined or dynamically determined schedule, accumulate sufficient information about the legacy devices in the legacy neighbor network 814, and evaluate whether the performance of the legacy device will be impaired by channel reuse.

In some embodiments, as discussed above in FIGS. 1-8B, only two networks may reuse the channel at any given time. In other embodiments, any suitable number of networks may simultaneously reuse the channel. The number of networks that can reuse the channel may depend on the spatial separation between each of the networks, the performance of the channel and the network (e.g., traffic, attenuation, etc.), and other suitable considerations. As discussed above with reference to FIGS. 3-8B, the local feature-capable device 104 can analyze the channel performance of the legacy devices in the local and neighbor networks and can determine to reuse the channel with the neighbor network 108. However, because the legacy devices (e.g., the legacy device 106 in the local network 102) do not support the adaptive channel reuse operations, the legacy devices 106 always defer their respective pending transmissions in response to detecting an SOF delimiter from a neighbor network 108. Therefore, for example, when the feature-capable device 104 determines to reuse the channel with the neighbor network 108, there may be inconsistencies in the channel access behavior of the feature-capable device 104 and the legacy device 106 with respect to the neighbor network 108. Specifically, the feature-capable devices 104 may reuse the channel with the neighbor network 108, while the legacy devices 106 may share the channel with the neighbor network 108. Because such inconsistencies can impact the overall system performance, the feature-capable device 104 can execute operations described with reference to the timing diagram of FIG. 9 to cause the legacy device 106 to synchronize with the in-network feature-capable device, become out-of-sync with the neighbor network 108, and to reuse the channel with the neighbor network 108.

Figure 9:
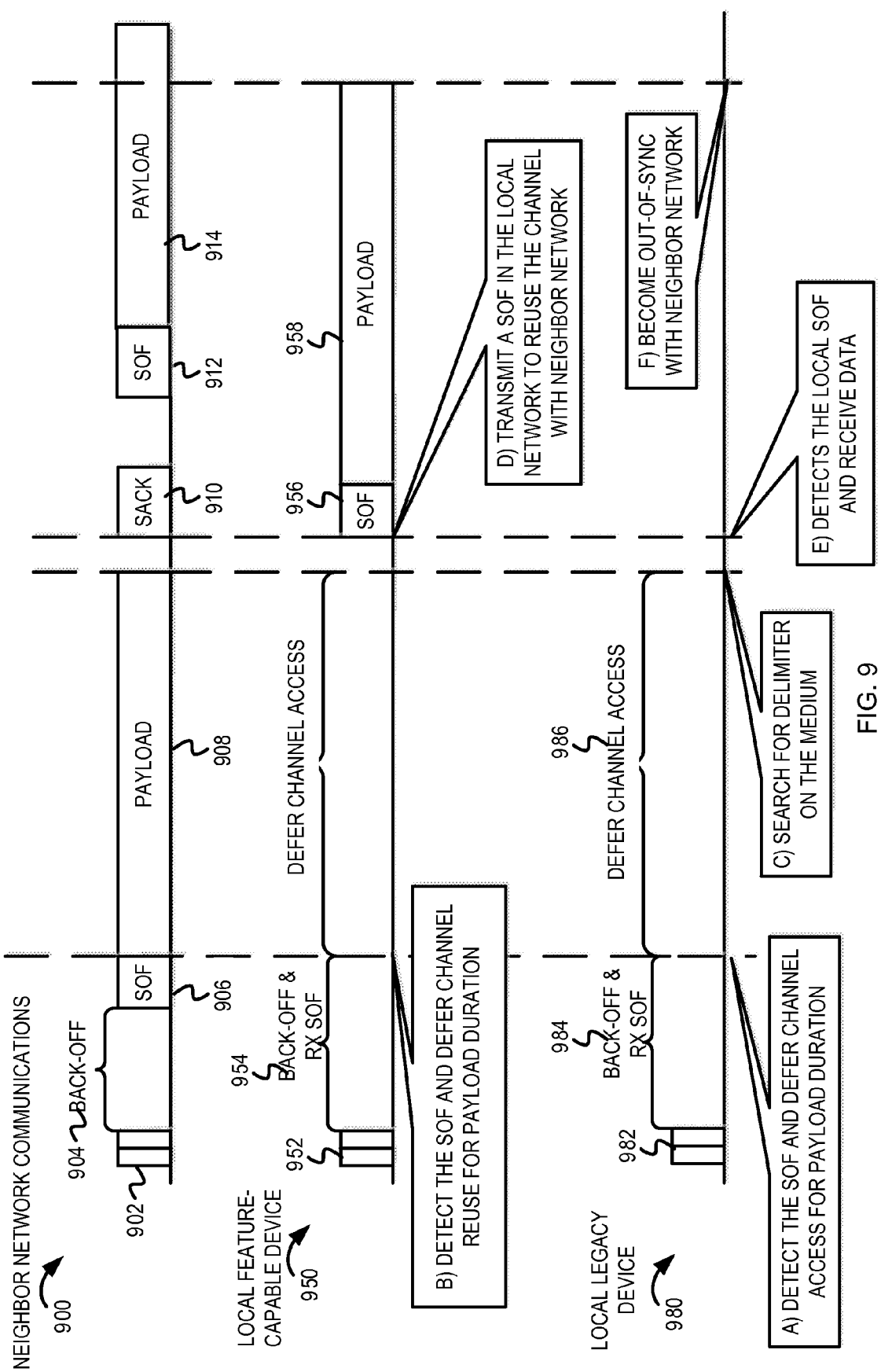
FIG. 9 is a timing diagram illustrating operations of a legacy device synchronizing with an in-network feature-capable device for channel reuse with a neighbor network.

In FIG. 9, the timing diagram 900 illustrates communications between network devices in the neighbor network 108. The timing diagram 950 illustrates transmissions of a transmitting local feature-capable device 104 in the local network 102. The timing diagram 980 illustrates transmissions of a local legacy device 106 in the local network 102. A transmitting device in the neighbor network 108 transmits priority information in the PRS slots 902, initiates a back-off time interval 904, and then transmits a data frame including a first SOF delimiter 906 and a first payload 908. The transmitting device then receives a SACK frame 910 from a receiving device in the neighbor network 108. Referring to the timing diagram 950, the local feature-capable device 104 transmits priority information in the PRS slots 952 and initiates a back-off time interval 954. During the back-off time interval 954, the local feature-capable device 104 detects the first SOF delimiter 906 in the neighbor network 108. Likewise, referring to the timing diagram 980, the local legacy device 106 transmits priority information in the PRS slots 982 and initiates a back-off time interval 984. During the back-off time interval 984, the local legacy device 106 detects the first SOF delimiter 906 in the neighbor network 108. The local legacy device 106 operates in accordance with conventional CSMA operations, executes virtual carrier sensing operations, and defers channel access operations for the duration 986 that the first payload 908 is transmitted in the neighbor network 108 (see stage A). In deferring channel access, the local legacy device 106 may not listen for transmissions on the communication channel. The local legacy device 106 may calculate the time interval for which the neighbor network 108 will transmit the payload 908 (e.g., based on information in the first SOF delimiter 906) and can resume carrier sensing (and channel access) operations after this time interval elapses (e.g., after transmission of the payload 908 is completed). The local feature-capable device 104 detects the SOF delimiter 906 from the neighbor network 108 and also detects the local legacy device 106 in the local network 102. Because the local feature-capable device 104 is scheduled to communicate with the local legacy device 106 and because the local legacy device 106 has already deferred channel access operations, the local feature-capable device 104 can defer channel reuse for the duration 986 that the first payload 908 is transmitted in the neighbor network 108 (see stage B).

In some embodiments as depicted in FIG. 9, after the first payload 908 is transmitted in the neighbor network 108, the local legacy device 106 can search for a delimiter on the shared communication medium (see stage C) to determine whether another device is communicating on the communication medium. The local feature-capable device 104 can operate in accordance with the current channel reuse decision (determined at block 314 of FIG. 4) to reuse the channel with the neighbor network 108. The local feature-capable device 104 can reuse the channel with the neighbor network 108 by broadcasting data whose transmission is aligned with the SACK frame 910 transmitted in the neighbor network 108. In FIG. 9, the local feature-capable device 104 can transmit the local SOF delimiter 956 in the local network 102 to coincide with the transmission of the SACK frame 910 in the neighbor network 108 (see stage D). In some embodiments, the local feature-capable device 104 can estimate the transmission time (of the first payload 908) in the neighbor network 108, estimate the time instant at which the SACK frame 910 will be transmitted in the neighbor network 108, and transmit the local SOF 956 at the same time instant. The local legacy device 106 can detect the local SOF delimiter 956 transmitted by the local feature-capable device 104 (e.g., because of a stronger signal strength relative to the SACK frame 910) and can lock onto the transmissions of the local feature-capable device 104 (see stage E). The local feature-capable device 104 can (after transmitting the local SOF 956) then transmit a payload 958. Because the local legacy device 106 is synchronized with the local feature-capable device 104, the local legacy device 106 can receive the payload 958 transmitted by the local feature-capable device 104 (see stage E). As depicted in FIG. 9, the network device in the neighbor network 108 transmits a second SOF delimiter 912 and a second payload 914 while the local feature-capable device 104 is transmitting its payload 958. However, because the local legacy device 106 is synchronized with the local feature-capable device 104, the local legacy device 106 may not detect the SOF delimiter 912 and other transmissions in the neighbor network 108. Causing the local legacy device 106 to become out-of-sync with the neighbor network 108 can reduce the probability that the local legacy device 106 will detect and lock onto transmissions in the neighbor network 108. This can enable the local legacy device 106 to passively reuse the channel with the neighbor network 108 even though the local legacy device 106 does not support the channel reuse operations. After the local network 102 and the neighbor network 108 begin to reuse the channel with each other (i.e., go out-of-sync), the probability that the local legacy device 106 will detect transmissions in the neighbor network is very low (see stage F).

It is noted that in some embodiments, the local feature-capable device 104 can execute the operations (described above in FIG. 9) with the local legacy devices 106 at periodic time intervals. In other embodiments, the local feature-capable device 104 can execute the operations (described above in FIG. 9) with the local legacy device 106 when the local legacy device 106 synchronizes with the neighbor network 108. For example, the local feature-capable device 104 may detect a transmission of the neighbor network 108 and may also determine that the local legacy device 106 has deferred channel access in response to the transmission from the neighbor network 108. Accordingly, the local feature-capable device 104 can execute the operations described below to cause the local legacy device 106 to become out-of-sync with the neighbor network 108 and to synchronize with the local feature-capable device 104.

Figure 10:
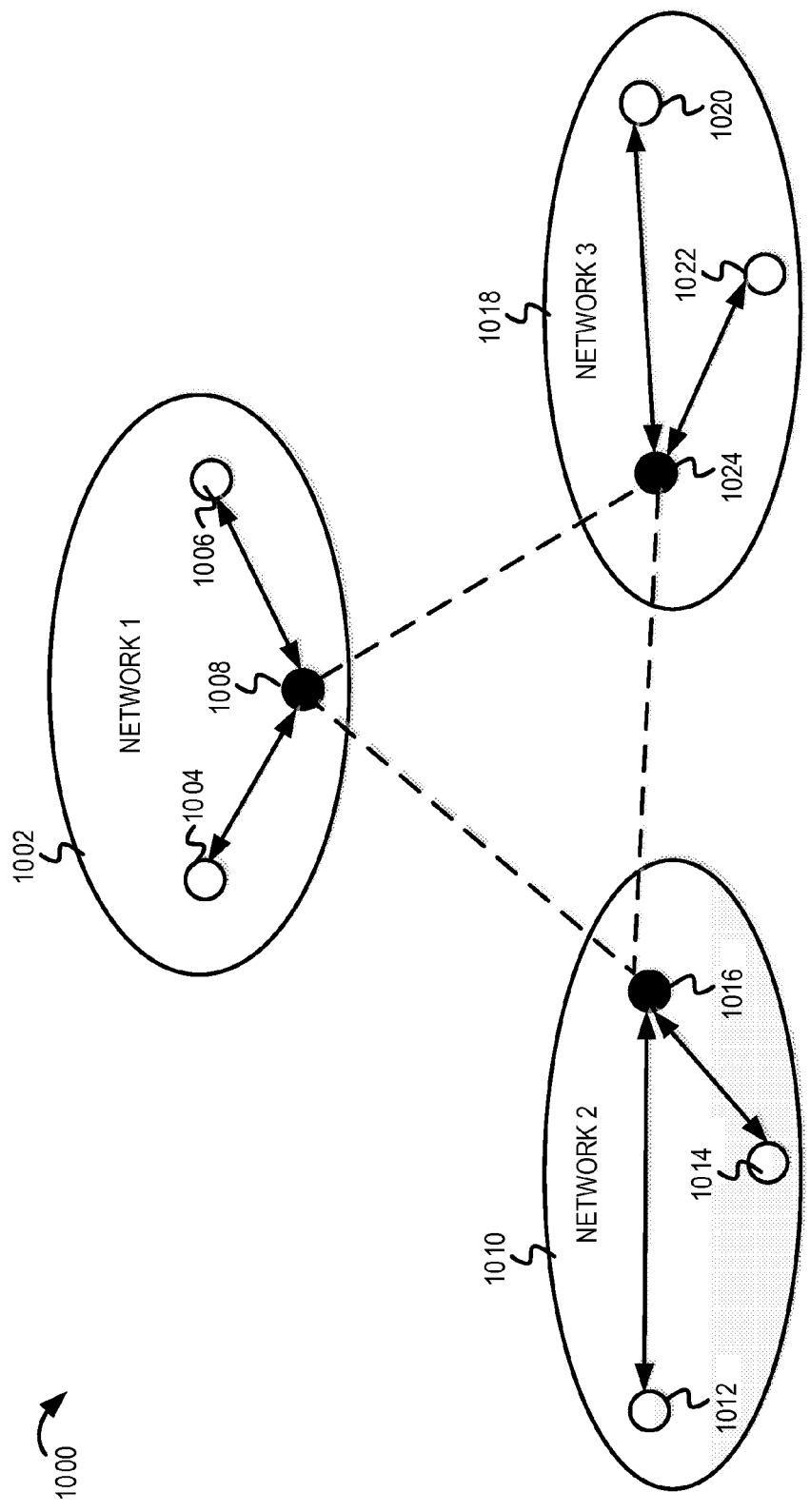
FIG. 10 is an example conceptual diagram including a hierarchical channel reuse decision coordination mechanism.

In some embodiments, as depicted in FIG. 10, a hierarchical channel reuse decision coordination mechanism can be employed to ensure that all the feature-capable devices in neighbor networks reach a consistent channel reuse decision. FIG. 10 depicts a system 1000 with three neighbor networks 1002, 1010, and 1018. The network 1002 comprises three feature-capable devices 1004, 1006, and 1008; the network 1010 comprises three feature-capable devices 1012, 1014, and 1016; and the network 1018 comprises three feature-capable devices 1020, 1022, and 1024. One feature-capable device in each network can be selected (e.g., by other feature-capable devices in the network) as the local decision coordinator of the network. Referring to FIG. 10, the feature-capable device 1008 can be selected as the local decision coordinator of the network 1002; the feature-capable device 1016 can be selected as the local decision coordinator of the network 1010; and the feature-capable device 1024 can be selected as the local decision coordinator of the network 1018. Each local decision coordinator (e.g., the local decision coordinator 1008) may be responsible for collecting the channel reuse decisions from other feature-capable devices 1004 and 1006 in the network 1002 and for determining the intra-network channel reuse decision for the network 1002. To coordinate channel reuse decisions across neighbor networks, each local decision coordinator (e.g., in each of the neighbor networks) can communicate with each other, exchange their respective intra-network channel reuse decision, and determine a global channel reuse decision (also referred to herein as the "inter-network channel reuse decision"). In some embodiments, local channel reuse decisions can be communicated from local feature-capable devices 1004 and 1006 to the local decision coordinator 1008 in the local network 1002 in a unicast packet. The local decision coordinator 1008 may transmit an acknowledgement message to the local feature-capable devices 1004 and 1006 in a unicast packet. For communications between local decision coordinators (e.g., the local decision coordinators 1008 and 1016) among neighbor networks, each local decision coordinator can transmit the intra-network channel reuse decision using multi-network broadcast packets. The receiving local decision coordinator (of another neighbor network) may or may not transmit an acknowledgement message in response. In some embodiments, because network devices in neighbor networks may reuse the channel with each other, their channel accesses may not be synchronized. Thus, for example, when a local decision coordinator 1008 in a first network 1002 sends its intra-network channel reuse decision to the local decision coordinator 1016 in the second network 1010, the local decision coordinator 1016 in the second network 1010 may be in a transmitting or a receiving state and therefore, may not receive the intra-network channel reuse decision transmitted by the local decision coordinator 1008 in the first network 1002. Therefore, to ensure that each local coordinator 1016 receives the multi-network broadcast messages from other local coordinator 1008, the multi-network broadcast messages (comprising the intra-network channel reuse decision) may be transmitted at the beginning of a beacon period.

The beacon period may be synchronized to a zero-crossing of an AC line cycle or to another suitable time reference (e.g. a beacon transmission offset indicated in each transmitted beacon). In some embodiments, if the local decision coordinator 1008 is also the central coordinator of its local network 1002, the local decision coordinator 1008 may piggyback the intra-network network channel reuse decision on the beacon frame transmitted at the beginning of each beacon period. If the local decision coordinator 1008 is not the central coordinator of its local network 1002, the local decision coordinator 1008 may transmit a discovery beacon frame including the intra-network network channel reuse decision after the central coordinator transmits the beacon frame.

It should be understood that FIGS. 1-10 and the operations described herein are examples meant to aid in understanding embodiments and should not be used to limit embodiments or limit scope of the claims. Embodiments may perform additional operations, fewer operations, operations in a different order, operations in parallel, and some operations differently. For example, instead of forcing the local legacy devices 106 to reuse the communication channel as described above, the local legacy devices 106 may be permitted to operate in accordance with the conventional CSMA procedures (e.g., by sharing the channel) while the local feature-capable devices 104 may share the channel with neighbor networks 108. This inconsistency in channel reuse decision may be allowed if it does not result in performance loss for the legacy devices in the local network 102 and the neighbor network 108. In some embodiments, each feature-capable device can periodically execute the operations described in FIGS. 3-5 to determine whether to reuse or share the channel with each neighbor network 108. In other embodiments, the feature-capable device can execute the operations if a change in the local network 102 and/or the neighbor network 108 is detected (e.g., a new network device is added to the local network, etc.).

It is noted that in some embodiments, the channel performance measurements (e.g., received signal strength information) may be measured on a per-network device basis. For example, the channel performance measurements can be determined for each network device (e.g., legacy device and/or feature-capable device) in the local network and/or the neighbor networks. In some embodiments, however, the adaptive channel reuse operations can be extended to enable each feature-capable device to intelligently determine whether to reuse or share the channel with the neighbor networks. In this embodiment, a local feature-capable device 104 may share the channel with a network device in the neighbor network 102 only if reusing the channel will cause significant interference between the two devices. Suppose that a first communication link (between a first transmitting device and a first receiving device) and a second communication link (between a second transmitting device and a second receiving device) are neighbor communication links in a CSMA system. In this example, the two neighbor communication links can reuse the channel if the resulting SINRs at the first and second receiving devices are sufficiently high (e.g., greater than a predetermined SINR threshold). As similarly discussed above with reference to neighbor networks, the channel reuse decision can be determined for neighbor communication links and the channel reuse decision can be coordinated across all the end devices of the neighbor communication links. In some embodiments, the channel reuse decision can be coordinated amongst the end-devices by exchanging information in existing reserved fields in frame delimiters. In another embodiment, the end-devices can exchange their respective local channel reuse decisions (to coordinate the channel reuse decision) in a portion of the payload of a data or management frame. If a communication link comprises two feature-capable end devices, each end device can combine its local channel reuse decision with the local channel reuse decision received from the other feature-capable end-device. To coordinate channel reuse decisions with the neighbor communication link, the feature-capable end-devices of each communication link can periodically transmit/broadcast the communication link's channel reuse decision to its neighbor links (e.g., in a management message). For a pair of neighbor communication links, if one communication link determines to share the channel with the other communication link, both the communication links may share the channel with each other. Specifically, the two neighbor communication links may reuse the channel with each other only if both communication links determine to reuse the channel. As disused above, if one end-device (or both end-devices) of a communication link is a legacy device, the feature-capable end-device of the communication link (or a feature-capable end-device of the neighbor communication link) can initiate the channel reuse with the legacy end-devices.

Although embodiments disclose operations for adaptive channel reuse in CSMA systems, embodiments are not so limited. In other embodiments, the operations for adaptive channel reuse can also be extended to time division multiple access (TDMA) systems. Each network device in a TDMA system is assigned one or more specific time slots, during which the network device can transmit data to one or more other network devices. In some embodiments, a feature-capable device of a TDMA network can be designated as a central controller. The central controller can determine the transmission schedule of all the network devices in the TDMA system. The adaptive channel reuse operations described above can be used to determine which network devices can reuse the channel in each time slot. For example, based on the expected channel condition at each legacy device and the channel performance measurements (e.g., signal strength information) measured by each feature-capable device, the transmission schedule (for each feature-capable device and legacy device) can be determined to optimize the system performance. In some embodiments, the performance gain of the TDMA system can be further improved by increasing the extent of channel reuse for network devices in the TDMA system. More specifically, in the TDMA system, two neighbor communication links (e.g., each with a different set of transmitting and receiving network devices) may reuse the channel if the resulting SINRs at both the receiving network devices are sufficiently high (e.g., greater than a predetermined SINR threshold). Referring to FIG. 1, if the networks 102 and 108 are part of a TDMA system, the network devices 104 and 110 may transmit data to the network devices 106 and 112, respectively, in the same time slot. In some embodiments, the local feature-capable device 104 can execute a transmission power control mechanism to implement adaptive channel reuse in the TDMA system. For example, in FIG. 1, transmissions between the network devices 104 and 106 and transmissions between the network devices 110 and 112 may not be scheduled in the same time slot because of strong interference between the network devices 110 and 112. However, if transmission power control is applied, these data transmissions can be scheduled in the same time slot. For example, the transmitting devices 104 and 110 may decrease their transmission power (e.g., by a power factor) to communicate with the receiving devices 106 and 112 respectively to reuse the channel with the neighbor network in the same time slot. Accordingly, the SINR at the receiving devices 106 and 112 may be sufficiently high to support a high transmission data rate.

As will be appreciated by one skilled in the art, aspects of the present inventive subject matter may be embodied as a system, method, or computer program product. Accordingly, aspects of the present inventive subject matter may take the form of an entirely hardware embodiment, a software embodiment (including firmware, resident software, microcode, etc.) or an embodiment combining software and hardware aspects that may all generally be referred to herein as a "circuit," "module" or "system." Furthermore, aspects of the present inventive subject matter may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present inventive subject matter may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present inventive subject matter are described with reference to flowchart illustrations and/or block diagrams of methods, apparatus (systems) and computer program products according to embodiments of the inventive subject matter. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 11:
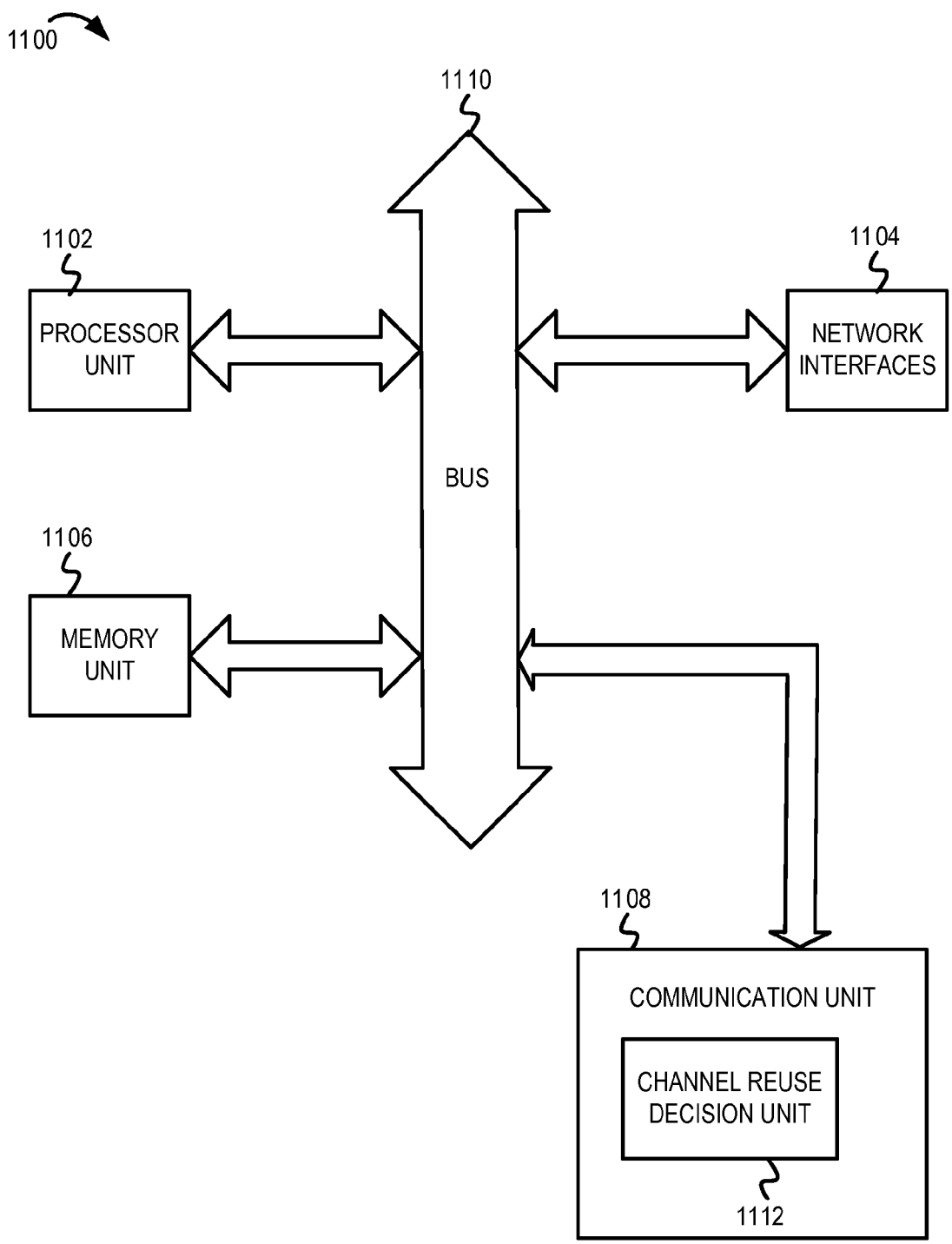
FIG. 11 is a block diagram of one embodiment of an electronic device including a mechanism for adaptive channel reuse.

FIG. 11 is a block diagram of one embodiment of an electronic device 1100 including a mechanism for adaptive channel reuse. In some embodiments, the electronic device 1100 can be a laptop computer, a tablet computer, a netbook, a mobile phone, a smart appliance, a gaming console, a desktop computer, or other suitable electronic device comprising communication capabilities. The electronic device 1100 includes a processor unit 1102 (possibly including multiple processors, multiple cores, multiple nodes, and/or implementing multi-threading, etc.). The electronic device 1100 includes a memory unit 1106. The memory unit 1106 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of computer-readable storage media. The electronic device 1100 also includes a bus 1110 (e.g., PCI, ISA, PCI-Express, HyperTransport®, Infini-Band®, NuBus, AHB, AXI, etc.), and network interfaces 1104 that include at least one of a wireless network interface (e.g., a WLAN interface, a Bluetooth® interface, a WiMAX interface, a ZigBee® interface, a Wireless USB interface, etc.) and a wired network interface (e.g., a powerline communication interface, an Ethernet interface, etc.).

The electronic device 1100 also includes a communication unit 1108. The communication unit 1108 comprises a channel reuse decision unit 1112. The communication unit 1208 can execute functionality described above with reference to FIGS. 1-10 to analyze channel performance measurements associated with legacy devices in a local network (that comprises the electronic device 1100) and/or a neighbor network to determine whether to reuse or share a channel with the neighbor network. Any one of these functionalities may be partially (or entirely) implemented in hardware and/or on the processor unit 1102. For example, the functionality may be implemented with an application specific integrated circuit, in logic implemented in the processor unit 1102, in a co-processor on a peripheral device or card, etc. Further, realizations may include fewer or additional components not illustrated in FIG. 11 (e.g., video cards, audio cards, additional network interfaces, peripheral devices, etc.). For example, the communication unit 1108 may comprise one or more additional processors that are distinct from the processor unit 1102 coupled with the bus 1110. The processor unit 1102, the memory unit 1106, and the network interfaces 1104 are coupled to the bus 1110. Although illustrated as being coupled to the bus 1110, the memory unit 1106 may be coupled to the processor unit 1102. In some implementations, the electronic device 1100 may also comprise a PHY digital signal processor (DSP), an analog front-end (AFE) unit, and other suitable processing units. In some embodiments, the memory unit 1106 may comprise a medium access control (MAC) module, an operation system module and other supporting modules. In some embodiments, the MAC module can comprise one or more instructions for executing the adaptive channel reuse operations described above in FIGS. 1-10. The processor unit 1102 may execute instructions stored in the memory unit 1106 to execute one or more operations described above in FIGS. 1-10. The PHY DSP unit may implement functionality for transmission and reception of PPDUs with different modulation and coding schemes. The PHY DSP unit can operate under the control of the MAC module to transmit a PPDU at a proper time. The AFE unit can comprise functionality for transmitting and receiving baseband signals at specified radio frequencies.

While the embodiments are described with reference to various implementations and exploitations, it will be understood that these embodiments are illustrative and that the scope of the inventive subject matter is not limited to them. In general, techniques for adaptive channel reuse in communication networks as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

What is claimed is:

1. A method for channel reuse comprising:
   determining, at a first network device of a local network, whether to reuse a communication channel between the local network and a neighbor network based, at least in part, on an inter-network channel reuse indicator, wherein the first network device is of a first device type that supports inter-network channel reuse;
   determining that at least one of the local network and the neighbor network includes a second network device of a second device type that does not support inter-network channel reuse;
   in response to determining to reuse the communication channel between the local network and the neighbor network, determining a channel performance measurement associated with the second network device based, at least in part, on reusing the communication channel with the second network device; and
   determining whether to continue to reuse the communication channel based, at least in part, on the channel performance measurement associated with the second network device.

2. The method of claim 1, further comprising:
   determining, at the first network device, a first local channel reuse indicator that indicates whether the first network device should reuse the communication channel with the neighbor network;
   receiving, at the first network device, at least a second local channel reuse indicator from at least one other network device of the first device type in at least one of the local network and the neighbor network; and
   determining the inter-network channel reuse indicator based, at least in part, on the first local channel reuse indicator and the second local channel reuse indicator.

3. The method of claim 2, wherein the first local channel reuse indicator is determined based on at least one member of a group consisting of:
   an intra-network attenuation between a pair of network devices in the local network, wherein the pair of network devices includes the first network device; and
   an inter-network attenuation between the first network device in the local network and a third network device in the neighbor network.

4. The method of claim 1, further comprising:
   receiving a first local channel reuse indicator associated with a third network device in the local network, and a second local channel reuse indicator associated with a fourth network device in the neighbor network, wherein the third network device and the fourth network device are of the first device type;
   determining whether each of the first local channel reuse indicator and the second local channel reuse indicator indicates to reuse the communication channel;
   in response to determining that each of the first local channel reuse indicator and the second local channel reuse indicator indicates to reuse the communication channel, generating the inter-network channel reuse indicator that indicates to reuse the communication channel; and
   in response to determining that the first local channel reuse indicator or the second local channel reuse indicator indicates to share the communication channel, generating the inter-network channel reuse indicator that indicates to share the communication channel.

5. The method of claim 1, further comprising:
   determining that the second network device of the second device type is part of the local network;
   in response to determining that the neighbor network does not include any network devices of the first device type, identifying a third network device of the second device type in the neighbor network;
   for each of the second network device and the third network device,
       determining data transmission information based, at least in part, on one or more messages communicated by a corresponding network device; and
       determining one or more channel performance measurements associated with the corresponding network device based, at least in part, on the data transmission information associated with the corresponding network device.

6. The method of claim 5, wherein, for each of the second network device and the third network device, determining the data transmission information comprises:
   determining at least one member of a group consisting of a data transmission rate and a bit loading estimate based, at least in part, on a start of frame (SOF) delimiter communicated to the corresponding network device; and
   determining at least one member of a group consisting of a packet error rate, a bit error rate, and a transmission success rate based, at least in part, on data transmission feedback communicated by the corresponding network device in a selective acknowledgement (SACK) delimiter.

7. The method of claim 1, wherein determining whether to continue to reuse the communication channel comprises:
   in response to determining that each channel performance measurement associated with each network device of the second device type in the local network and in the neighbor network meets a performance measurement threshold,
      determining to continue to reuse the communication channel with the neighbor network; and
   in response to determining that at least one channel performance measurement associated with at least one network device of the second device type does not meet the performance measurement threshold,
      determining to share the communication channel with the neighbor network.

8. The method of claim 7, further comprising:
   transmitting a notification to other network devices of the first device type in the local network and the neighbor network to indicate that the local network and the neighbor network should share the communication channel.

9. The method of claim 1, further comprising:
   broadcasting a request message on the communication channel requesting information about other network devices of the first device type in the local network and the neighbor network;
   in response to determining that a response message was not received during a time interval,
      determining that the local network and the neighbor network do not include other network devices of the first device type; and
   in response to determining that at least one response message was received during the time interval,
      identifying at least one other network device of the first device type based, at least in part, on the at least one response message received at the first network device.

10. The method of claim 1, further comprising:
   receiving, from a third network device of the first device type in the neighbor network, an indication of at least one network device of the second device type in the neighbor network.

11. The method of claim 1, further comprising:
   determining whether reusing the communication channel will affect performance of the second network device.

12. The method of claim 1, further comprising:
   determining to reuse the communication channel between the local network and the neighbor network in response to determining that the local network and the neighbor network do not include any network devices of the second device type.

13. The method of claim 1, further comprising:
   determining that the local network does not include any network devices of the second device type and that the neighbor network does not include any network devices of the first device type;
   detecting, at the first network device, a first transmission originating from the neighbor network;
   determining when a response message to the first transmission will be transmitted in the neighbor network in response to detecting the first transmission; and
   initiating a second transmission in the local network from the first network device to a third network device of the first device type, wherein the second transmission in the local network is completed before the response message is transmitted in the neighbor network.

14. The method of claim 1, further comprising:
   determining that the neighbor network does not include any network devices of the first device type;
   detecting, at the first network device, a first transmission originating from the neighbor network;
   determining a first time instant when transmission of a first data packet of the first transmission will be completed, a second time instant when a second data packet of the first transmission will be transmitted, and a third time instant when a response message to the first transmission will be transmitted in the neighbor network; and
   initiating a second transmission from the first network device in the local network at the second time instant, wherein the second transmission is completed before the third time instant.

15. The method of claim 1, further comprising determining that the second network device of the second device type is part of the neighbor network, wherein determining the channel performance measurements further comprises:
   dividing an inspection time interval allocated for determining the channel performance measurement into a channel reuse sub-interval and a channel share sub-interval;
   during the channel reuse sub-interval, reusing the communication channel with the neighbor network to exchange communications in the local network; and
   during the channel share sub-interval, sharing the communication channel with the neighbor network to detect one or more messages communicated by the second network device and to determine the channel performance measurement associated with the second network device.

16. The method of claim 1, further comprising:
   determining, at the first network device, a first local channel reuse indicator that indicates whether the first network device should reuse the communication channel with the neighbor network;
   determining that the first network device is a first coordinating device of the local network;
   receiving a second local channel reuse indicator from a third network device of the first device type in the local network;
   determining a first intra-network channel reuse indicator for the local network based, at least in part, on the first local channel reuse indicator and the second local channel reuse indicator;
   broadcasting the first intra-network channel reuse indicator for the local network to a second coordinating device of the neighbor network; and
   determining the inter-network channel reuse indicator based, at least in part, on the first intra-network channel reuse indicator and a second intra-network channel reuse indicator received from the neighbor network.

17. The method of claim 1, wherein the channel performance measurement includes at least one member of a group consisting of a data transmission rate, an error rate, a received signal strength indicator, and an attenuation level.

18. The method of claim 1, wherein determining to reuse the communication channel further comprises:
determining to initiate a first transmission from the first network device in the local network to a third network device of the first device type in the local network;
detecting, at the first network device, a second transmission originating from the neighbor network; and
ignoring the second transmission and initiating the first transmission in the local network.

19. The method of claim 1, wherein determining to reuse the communication channel further comprises:
determining to initiate a first transmission from the first network device in the local network to the second network device of the second device type in the local network;
detecting, at the first network device, a second transmission originating from the neighbor network;
determining a first time instant when a response message to the second transmission will be transmitted in the neighbor network; and
initiating the first transmission in the local network at the first time instant to cause the second network device to synchronize with the first network device and become out-of-sync with the neighbor network.

20. The method of claim 1, wherein in response to determining to share the communication channel, the method further comprises:
determining to initiate a first transmission from the first network device in the local network to a third network device in the local network;
detecting, at the first network device, a second transmission originating from the neighbor network; and
deferring the first transmission from the first network device for a duration of the second transmission in the neighbor network.

21. A first network device of a local network comprising:
a processor; and
a memory to store instructions, which when executed by the processor, cause the first network device to:
determine whether to reuse a communication channel between the local network and a neighbor network based, at least in part, on an inter-network channel reuse indicator, wherein the first network device is of a first device type that supports inter-network channel reuse;
determine that at least one of the local network and the neighbor network includes a second network device of a second device type that does not support inter-network channel reuse;
in response to determining to reuse the communication channel between the local network and the neighbor network,
determine a channel performance measurement associated with the second network device based, at least in part, on reusing the communication channel with the second network device; and
determine whether to continue to reuse the communication channel based, at least in part, on the channel performance measurement associated with the second network device.

22. The first network device of claim 21, wherein the instructions, which when executed by the processor, further cause the first network device to:
determine a first local channel reuse indicator that indicates whether the first network device should reuse the communication channel with the neighbor network;
receive at least a second local channel reuse indicator from at least one other network device of the first device type in at least one of the local network and the neighbor network; and
determine the inter-network channel reuse indicator based, at least in part, on the first local channel reuse indicator and the second local channel reuse indicator.

23. The first network device of claim 21, wherein causing the first network device to determine whether to continue to reuse the communication channel comprises causing the first network device to:
in response to determining that each channel performance measurement associated with each network device of the second device type in the local network and in the neighbor network meets a performance measurement threshold,
determine to continue to reuse the communication channel with the neighbor network; and
in response to determining that at least one channel performance measurement associated with at least one network device of the second device type does not meet the performance measurement threshold,
determine to share the communication channel with the neighbor network.

24. The first network device of claim 21, wherein the instructions, which when executed by the processor, further cause the first network device to:
determine that the local network does not include any network devices of the second device type and that the neighbor network does not include any network devices of the first device type;
detect a first transmission originating from the neighbor network;
determine when a response message to the first transmission will be transmitted in the neighbor network in response to detecting the first transmission; and
initiate a second transmission in the local network to a third network device of the first device type, wherein the second transmission in the local network is completed before the response message is transmitted in the neighbor network.

25. The first network device of claim 21, wherein the instructions, which when executed by the processor, further cause the first network device to:
determine that the neighbor network does not include any network devices of the first device type;
detect a first transmission originating from the neighbor network;
determine a first time instant when transmission of a first data packet of the first transmission will be completed, a second time instant when a second data packet of the first transmission will be transmitted, and a third time instant when a response message to the first transmission will be transmitted in the neighbor network; and
initiate a second transmission in the local network at the second time instant, wherein the second transmission in the local network is completed before the third time instant.

26. The first network device of claim 21, wherein the instructions, which when executed by the processor, further cause the first network device to:
determine that the second network device of the second device type is part of the neighbor network;

divide an inspection time interval allocated for determining the channel performance measurement into a channel reuse sub-interval and a channel share sub-interval;

during the channel reuse sub-interval, reuse the communication channel with the neighbor network to exchange communications in the local network; and during the channel share sub-interval, share the communication channel with the neighbor network to detect one or more messages communicated by the second network device and to determine the channel performance measurement associated with the second network device.

27. The first network device of claim 21, wherein in response to determining to reuse the communication channel, the instructions, which when executed by the processor, further cause the first network device to:

determine to initiate a first transmission from the first network device in the local network to the second network device of the second device type in the local network;

detect a second transmission originating from the neighbor network;

determine a first time instant when a response message to the second transmission will be transmitted in the neighbor network; and initiate the first transmission in the local network at the first time instant to cause the second network device to synchronize with the first network device and become out-of-sync with the neighbor network.

28. A non-transitory machine-readable storage medium having instructions stored therein, which when executed by a processor causes the processor to perform operations that comprise:

determining, at a first network device of a local network, whether to reuse a communication channel between the local network and a neighbor network based, at least in part, on an inter-network channel reuse indicator, wherein the first network device is of a first device type that supports inter-network channel reuse;

determining that at least one of the local network and the neighbor network includes a second network device of a second device type that does not support inter-network channel reuse;

in response to determining to reuse the communication channel between the local network and the neighbor network, determining a channel performance measurement associated with the second network device based, at least in part, on reusing the communication channel with the second network device; and determining whether to continue to reuse the communication channel based, at least in part, on the channel performance measurement associated with the second network device.

29. The non-transitory machine-readable storage medium of claim 28, wherein said operation of determining whether to continue to reuse the communication channel comprises:

in response to determining that each channel performance measurement associated with each network device of the second device type in the local network and in the neighbor network meets a performance measurement threshold, determining to continue to reuse the communication channel with the neighbor network; and in response to determining that at least one channel performance measurement associated with at least one network device of the second device type does not meet the performance measurement threshold, determining to share the communication channel with the neighbor network.

30. The non-transitory machine-readable storage medium of claim 28, wherein the operations further comprise:

determining that the local network does not include any network devices of the second device type and that the neighbor network does not include any network devices of the first device type;

detecting, at the first network device, a first transmission originating from the neighbor network;

determining when a response message to the first transmission will be transmitted in the neighbor network in response to detecting the first transmission; and initiating a second transmission in the local network from the first network device to a third network device of the first device type, wherein the second transmission in the local network is completed before the response message is transmitted in the neighbor network.

31. The non-transitory machine-readable storage medium of claim 28, wherein the operations further comprise:

determining that the neighbor network does not include any network devices of the first device type;

detecting, at the first network device, a first transmission originating from the neighbor network;

determining a first time instant when transmission of a first data packet of the first transmission will be completed, a second time instant when a second data packet of the first transmission will be transmitted, and a third time instant when a response message to the first transmission will be transmitted in the neighbor network; and initiating a second transmission in the local network at the second time instant, wherein the second transmission is completed before the third time instant.

32. The non-transitory machine-readable storage medium of claim 28, wherein in response to determining to reuse the communication channel, the operations further comprise:

determining to initiate a first transmission from the first network device in the local network to the second network device of the second device type in the local network;

detecting, at the first network device, a second transmission originating from the neighbor network;

determining a first time instant when a response message to the second transmission will be transmitted in the neighbor network; and initiating the first transmission in the local network at the first time instant to cause the second network device to synchronize with the first network device and become out-of-sync with the neighbor network.

* * * * *